United States Patent
Kawai et al.

(10) Patent No.: US 9,256,995 B2
(45) Date of Patent: Feb. 9, 2016

(54) APPARATUS FOR DIAGNOSING DRIVING BEHAVIOR, METHOD FOR DIAGNOSING DRIVING BEHAVIOR, AND PROGRAM THEREOF

(71) Applicant: FUJITSU LIMITED, Kawasaki-shi, Kanagawa (JP)

(72) Inventors: Jun Kawai, Kawasaki (JP); Toshiaki Ando, Yokohama (JP); Katsutoshi Yano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/279,939

(22) Filed: May 16, 2014

(65) Prior Publication Data

US 2014/0350777 A1 Nov. 27, 2014

(30) Foreign Application Priority Data

May 27, 2013 (JP) ................................. 2013-110565

(51) Int. Cl.
*G07C 5/08* (2006.01)
*B60W 50/08* (2012.01)

(52) U.S. Cl.
CPC ............. *G07C 5/0808* (2013.01); *B60W 50/08* (2013.01); *G07C 5/085* (2013.01)

(58) Field of Classification Search
CPC .... G01R 31/005; G07C 5/0808; G07C 5/085; G06Q 40/08; B60W 50/08
USPC .................... 701/32.3, 29, 31, 33, 213; 705/4
See application file for complete search history.

(56) References Cited

U.S. PATENT DOCUMENTS

| | | | |
|---|---|---|---|
| 8,630,768 B2 * | 1/2014 | McClellan et al. | 701/36 |
| 2007/0005404 A1 * | 1/2007 | Raz et al. | 705/4 |
| 2008/0262670 A1 * | 10/2008 | McClellan et al. | 701/29 |

(Continued)

FOREIGN PATENT DOCUMENTS

| | | | |
|---|---|---|---|
| JP | 2006-111183 | | 4/2006 |
| JP | 2007188476 A | * | 7/2007 |
| JP | 2007-328612 | | 12/2007 |
| JP | 2008-46759 | | 2/2008 |

OTHER PUBLICATIONS

M. Takahara et al. "Application of 'High Location Accuracy System' to Driving Support System", 15th World Congress on Intelligent Transport Systems and ITS America's Annual Meeting, Nov. 2008, pp. 1-7.

(Continued)

*Primary Examiner* — Rodney Butler
(74) *Attorney, Agent, or Firm* — Staas & Halsey LLP

(57) ABSTRACT

An apparatus for diagnosing driving behavior includes a storage unit that stores ideal running information defining a relationship between a vehicle speed and a vehicle position corresponding to a road situation, a generation unit that generates actual running information expressing a relationship between an actual vehicle speed and an actual position when a vehicle passes through a road, a condition identification unit that identifies a matching condition where the degree of correlation of the actual running information with the ideal running information exceeds a predetermined value, and a diagnosis unit that diagnoses a driving behavior of a driver of the vehicle, based on a degree of similarity between the ideal running information and the actual running information under the matching condition identified in the condition identification unit.

17 Claims, 12 Drawing Sheets

(56) References Cited

U.S. PATENT DOCUMENTS

| | | | |
|---|---|---|---|
| 2010/0030420 A1* | 2/2010 | Tauchi et al. | 701/29 |
| 2010/0152951 A1* | 6/2010 | Chin et al. | 701/29 |
| 2010/0211270 A1* | 8/2010 | Chin et al. | 701/44 |
| 2012/0303254 A1* | 11/2012 | Kirsch et al. | 701/123 |
| 2013/0204455 A1* | 8/2013 | Chia et al. | 701/1 |
| 2014/0257874 A1* | 9/2014 | Hayward et al. | 705/4 |
| 2014/0358326 A1* | 12/2014 | Phelan et al. | 701/1 |

OTHER PUBLICATIONS

K. Takeda et al., "The research and development in the next generation drive-recorder based on sensing and recognition of driving behavior", The 7th Meeting for Reporting the Results of Studies under Strategic Information Communication Promotion Program by Ministry of Internal Affairs and Communications, Oct. 2011, 8 pages.

* cited by examiner

FIG. 4

| TIME | VEHICLE POSITION (LATITUDE AND LONGITUDE) | DETAILED MOVEMENT DISTANCE [m] | VEHICLE SPEED [km/h] | ACCELERATION [G] | YAW RATE |
|---|---|---|---|---|---|
| 12:10:00 | 35.580154, 139.642453 | — | 0 | 0.01 | 0.00 |
| ... | ... | ... | ... | ... | ... |
| 12:15:30 | 35.581925, 139.642566 | 0.5 | 10 | -0.02 | 0.00 |
| 12:15:32 | 35.581925, 139.642567 | 0.3 | 0 | 0.00 | 0.00 |
| 12:15:34 | 35.581925, 139.642567 | 0.1 | 0 | 0.00 | 0.00 |
| 12:15:36 | 35.581924, 139.642567 | 0.0 | 0 | 0.00 | 0.00 |
| ... | ... | ... | ... | ... | ... |

FIG. 5

| INTERSECTION ID | INTERSECTION APPROACHING DIRECTION [deg] | INTERSECTION REFERENCE POINT (LATITUDE AND LONGITUDE) | RELATIVE DISTANCE FROM REFERENCE POINT [m] | IDEAL SPEED [km/h] | POSITION CLASSIFICATION |
|---|---|---|---|---|---|
| 1 | 170 | 35.580154, 139.642453 | 0.0 | 20 | INTERSECTION CENTER |
| | | | -2.0 | 10 | -- |
| | | | -4.5 | 0 | POSITION WITH LEFT VEHICLE VISIBLE |
| | | | -4.8 | 5 | -- |
| | | | -5.0 | 2 | TRAFFIC LANE BOUNDARY |
| | | | -5.2 | 5 | -- |
| | | | -5.5 | 0 | POSITION WITH RIGHT VEHICLE VISIBLE |
| | | | -6.0 | 5 | -- |
| | | | -6.5 | 0 | TEMPORARY STOP LINE |
| | | | -8.0 | 5 | -- |
| | | | -10.0 | 10 | -- |
| | | | -20.0 | 25 | -- |
| | | | -30.0 | 30 | DECELERATION STARTING POINT |
| 2 | 90 | 35.580154, 139.642453 | ... | ... | ... |
| 3 | 180 | 35.580162, 139.642777 | ... | ... | ... |
| ... | ... | ... | ... | ... | ... |

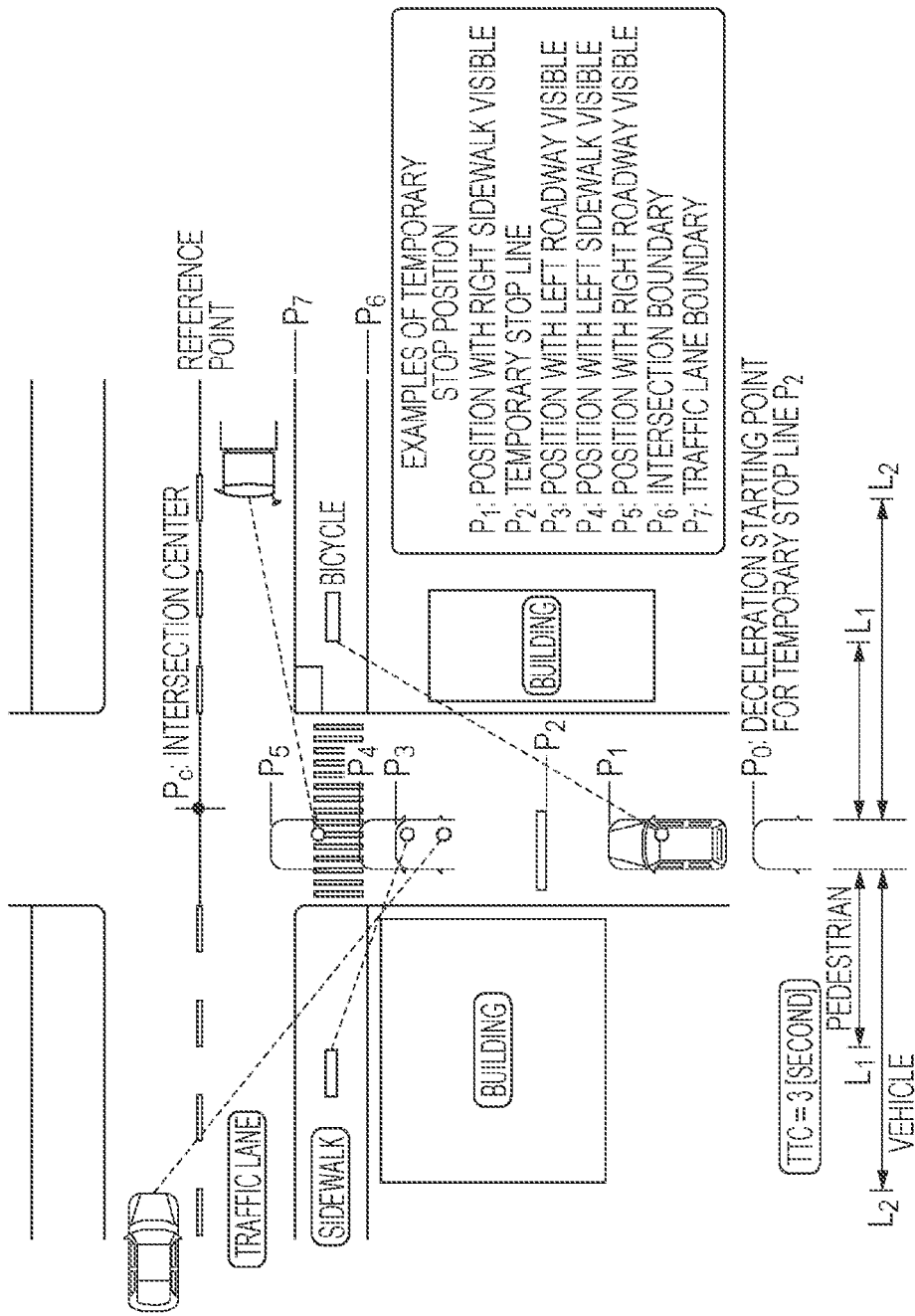

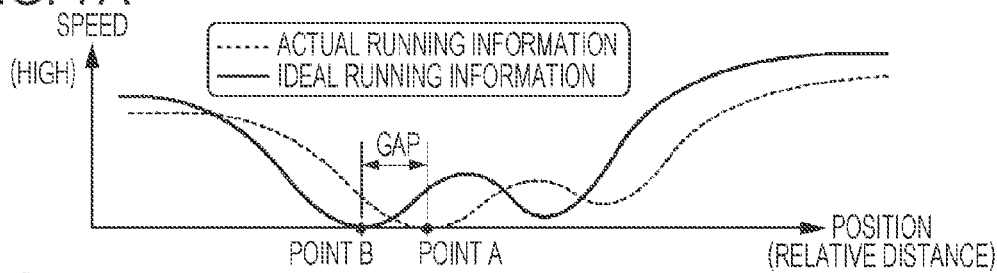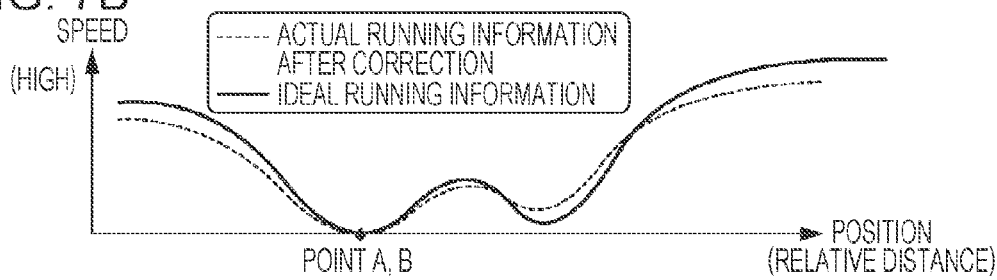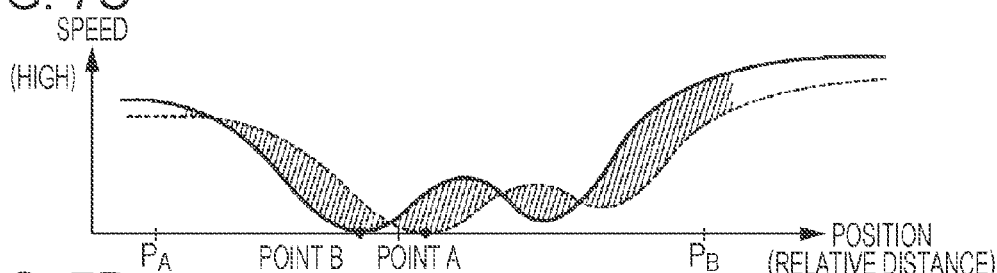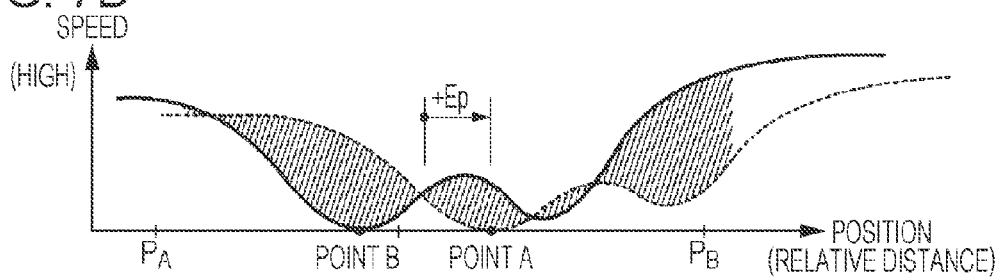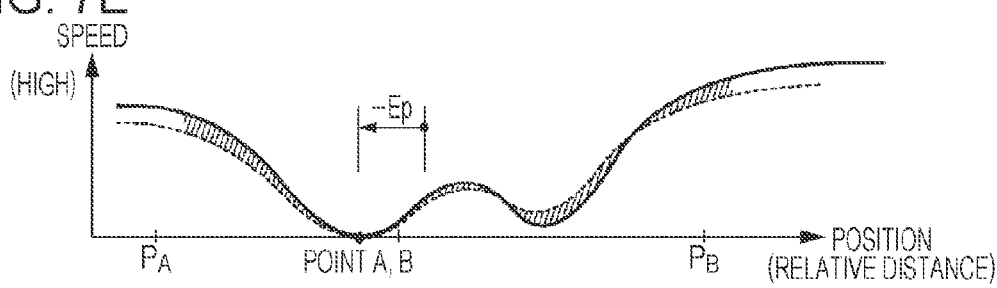

FIG. 10

CURRENT DRIVING BEHAVIOR EVALUATION (INTERSECTION)
OVERALL POINTS: 80 POINTS
GENERAL COMMENT: DRIVING WHOSE OVERALL SAFETY IS HIGH.
IMPLEMENTATION OF CONFIRMATION AND IMPLEMENTATION OF DRIVING AT REDUCED SPEED AT SPOT WITH POOR VISIBILITY ARE GOOD, AND IMPROVEMENT IS SEEN COMPARED TO BEFORE. PLEASE KEEP IT UP.
ON OTHER HAND, SINCE, IN SAME WAY AS PREVIOUSLY, CASE WHERE STOP AT TEMPORARY STOP LINE IS NOT PERFORMED AND CASE OF PROTRUDING FROM TEMPORARY STOP LINE ARE SEEN, PLEASE BE CAREFUL.
IN ADDITION, THERE IS TENDENCY TO SLIGHTLY PROTRUDE FROM STOP LINE FOR CONFIRMATION OF LEFT SIDE, AT SPOT WITH POOR VISIBILITY. PLEASE PAY ATTENTION TO BICYCLE OR LIKE.

DETAILS:

| | CURRENT CASE | STATISTICS |
|---|---|---|
| TEMPORARY STOP IMPLEMENTATION AT TEMPORARY STOP LINE: | 50% | 50% |
| STOP POSITION AT TEMPORARY STOP LINE (MAXIMUM): | +150 cm | +150 cm |
| STOP POSITION AT TEMPORARY STOP LINE (AVERAGE): | +60 cm | +60 cm |
| STOP POSITION AT TEMPORARY STOP LINE (MINIMUM): | -20 cm | -30 cm |
| TEMPORARY STOP AT POSITION FOR CONFIRMATION OF VISIBILITY: | 90% | 85% |
| STOP POSITION FOR CONFIRMATION OF VISIBILITY (MAXIMUM): | +80 cm | +120 cm |
| STOP POSITION FOR CONFIRMATION OF VISIBILITY (AVERAGE): | +20 cm | +30 cm |
| STOP POSITION FOR CONFIRMATION OF VISIBILITY (MINIMUM): | -20 cm | -80 cm |
| DRIVING AT REDUCED SPEED BETWEEN STOP POSITIONS: | 85 POINTS | 80 POINTS |
| STOPPING BRAKE: | 80 POINTS | 80 POINTS |
| START ACCELERATION: | 80 POINTS | 75 POINTS | ced # APPARATUS FOR DIAGNOSING DRIVING BEHAVIOR, METHOD FOR DIAGNOSING DRIVING BEHAVIOR, AND PROGRAM THEREOF

CROSS-REFERENCE TO RELATED APPLICATION

This application is based upon and claims the benefit of priority of the prior Japanese Patent Application No. 2013-110565, filed on May 27, 2013, the entire contents of which are incorporated herein by reference.

FIELD

The embodiments discussed herein are related to apparatus for diagnosing driving behavior, a method for diagnosing driving behavior, and a program that diagnose a driving behavior of a driver of a vehicle.

BACKGROUND

In the past, there has been developed a method for objectively evaluating a driving behavior of a driver, based on actual measurement information relating to a running state of a vehicle passing through a road such as an intersection or a traffic crossing point, a railroad crossing, or a traffic circle. In other words, based on position information and vehicle speed information of the vehicle, the driving behavior of the driver is evaluated using a preliminarily set driving behavior rule.

For example, there has been known a technique for determining, based on the transition of a vehicle speed at the time of passing through an intersection, whether or not a vehicle has temporarily stopped at a temporary stop line or a brief stop line, a technique for determining whether or not driving at reduced speed has been performed in an intersection approach, or the like. Such a technique has been disclosed in, for example, Japanese Laid-open Patent Publication No. 2007-328612. In addition, there also exists a technique where, in the case of evaluating such a driving behavior, a driver characteristic is multilaterally perceived by estimating the law-abiding tendency or the information collecting capability of a driver. Such a technique has been disclosed in, for example, Japanese Laid-open Patent Publication No. 2008-46759. Evaluation results of driving behaviors, obtained through these methods, may be provided as, for example, information for alerting a driver, or may be utilized as information for offering advice on a driving operation or correcting a vehicle behavior.

SUMMARY

According to an aspect of the invention, an apparatus for diagnosing driving behavior includes a storage unit that stores ideal running information defining a relationship between a vehicle speed and a vehicle position corresponding to a road situation, a generation unit that generates actual running information expressing a relationship between an actual vehicle speed and an actual position when a vehicle passes through a road, a condition identification unit that identifies a matching condition where the degree of correlation of the actual running information with the ideal running information exceeds a predetermined value, and a diagnosis unit that diagnoses a driving behavior of a driver of the vehicle, based on a degree of similarity between the ideal running information and the actual running information under the matching condition identified in the condition identification unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 exemplifies a table in a driving record database;

FIG. 5 exemplifies a table of ideal running information to serve as an evaluation criterion of a driving behavior;

FIG. 6 is a top view of an intersection, used for explaining a setting method for ideal running information;

FIGS. 7A to 7E are graphs for explaining a matching method for the ideal running information and the actual running information;

FIG. 10 illustrates an example of an output diagnosis result;

DESCRIPTION OF EMBODIMENTS

Figure 1:
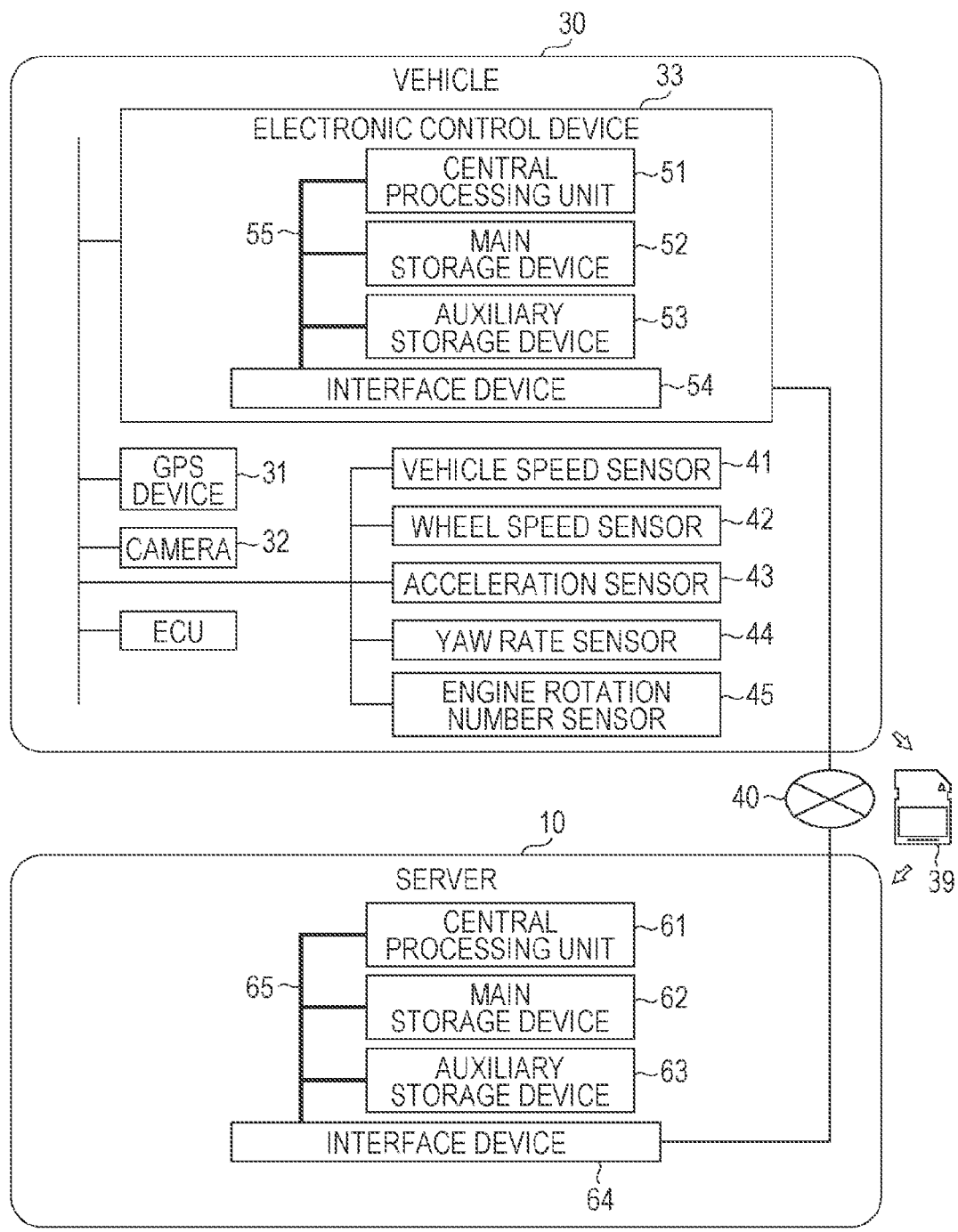
FIG. 1 is a diagram exemplifying a configuration of a driving diagnosis system according to an embodiment.

By the way, evaluation items of a driving behavior when a vehicle passes through a road may be variedly supposed in accordance with the structure and the kind of a road, in addition to a temporary stop operation at a temporary stop line and driving at reduced speed. For example, at an intersection with poor visibility, it is difficult to visually confirm a vehicle, a pedestrian, and the like, which approach from either side, from the position of a temporary stop line, and in some cases, it is desirable to temporarily stop again at a position nearer to the intersection in relation to the temporary stop line. When two roads intersect at an off-right angle with each other, the driver on one road could not obtain sufficiently rightward and leftward excellent visibilities for the other road just at a single position and temporarily stops more than one in divisional manner to obtain excellent visibilities for the other road. On the other hand, in a method of the related art, an environmental difference with respect to each road is not considered, and judgment turns out to be performed in accordance with a uniformed driving behavior rule. Owing to this, in some cases it is difficult to appropriately evaluate a driving behavior, and hence, it is difficult to improve driving diagnosis accuracy.

Accordingly, it is desired to improve driving diagnosis accuracy when a vehicle passes through a road.

Hereinafter, with reference to drawings, embodiments will be described that relate to apparatus for diagnosing driving behavior, a method for diagnosing driving behavior, and a program that diagnose a driving behavior of a driver of a vehicle. In this regard, however, the embodiments illustrated below are just exemplifications, and there is no intention of excluding various modifications or adoption of technology, not clearly specified in the embodiments. In other words, the present embodiments may be variously modified without departing from the scope thereof (the combination of one of the embodiments and an example of a modification thereto, and so forth) and be implemented.

[1. TERMS]

Apparatus for diagnosing driving behavior, a method for diagnosing driving behavior, disclosed hereinafter, diagnose skill, the degree of safety, and so forth of a driving behavior by matching an actual pattern and an ideal pattern or a reference pattern, against each other and comparing the actual pattern and the ideal pattern to each other with respect to a relationship between a speed and a position when a vehicle has passed through a road. Hereinafter, information corresponding to the term "actual pattern" here is called "actual running information" and information corresponding to the term "ideal pattern" or "reference pattern", here is called "ideal running information" or "reference pattern", respectively.

Examples of the term "road" here include a traffic intersection, which is referred below as an intersection, a crossroad, a T-shaped intersection, a three-forked road, a railroad crossing, a traffic circle, a straight road, a curved road, a ramp way, an interchange of a limited highway, a toll gate, a junction, and so forth. In the following description, the "intersection" is cited as an example of the "road", and driving diagnosis at the time of passing through an intersection will be described in detail. Accordingly, a word of "intersection" in a sentence in the following description may be arbitrarily read as "road" and understood. Further, the vehicle to be diagnosed is referred as "a subject vehicle" when needed and a vehicle travelling on the crossing road is referred simply as a vehicle. In addition, one of roads which intersect at an intersection is referred, when need, as a subject road on which a subject vehicle is travelling and the other referred as a crossing road which intersects with the subject road.

The term "ideal running information" is information to serve as an evaluation criterion of a driving behavior, and information in which an ideal running pattern of a vehicle is defined. In the ideal running information, a relationship between a vehicle speed and a position corresponding to a road situation is defined and, for example, a relationship between a vehicle speed and a position is defined that serves as a criterion when a vehicle passes through an intersection. The form of the ideal running information may be a form expressed by a rule associating a running condition of a vehicle with an ideal behavior, or alternatively, may be a form of describing a relationship between a vehicle speed and a position corresponding to an ideal passage pattern with respect to each intersection.

The ideal running information of the present embodiment includes information of a reference point of each intersection through which a vehicle is able to pass, and information of a relative distance from the reference point and an ideal speed corresponding to an approaching direction to the intersection. By using the ideal running information, a relationship between an ideal speed and a position with respect to each intersection is defined. In addition, in association with the information of a relative distance from the reference point, classification information is also included that indicates the meaning of the position thereof. As specific classification information, pieces of information indicative of a temporary stop line or a brief stop line, a traffic lane boundary, an intersection boundary, a position with a right sidewalk visible, a position with a left sidewalk visible, a position with a right roadway visible, and a position with a left roadway visible are cited that indicate types of position where the ideal speed becomes "0" or less than or equal to a predetermined value near "0".

The term "actual running information" is information corresponding to an actual motion or state of a vehicle, and information corresponding to an actual running pattern of the vehicle. A relationship between an actual vehicle speed and an actual position of the vehicle at the time of passing through an intersection is reflected in the actual running information. In the same way as the form of the ideal running information, the form of the actual running information may be a form expressed by a rule associating a running condition of the vehicle with an actual behavior thereof, or alternatively, may be a form of describing a relationship between a vehicle speed and a position corresponding to an actual passage pattern with respect to each intersection. It is assumed that the actual running information of the present embodiment is information indicating a relationship between a vehicle speed and a position, extracted from driving information of the vehicle. In addition, the term "driving information" means vehicle information associated with information of time. The term "vehicle information" here is classified into behavior information relating to a vehicle body behavior of the vehicle and state information relating to a running state of the vehicle.

As specific examples of the behavior information, a speed, a wheel speed, acceleration, a yaw rate, an engine rotation number, an accelerator position, a throttle position, a brake actuation state (the amount of a step-in operation of a brake pedal, brake fluid pressure, or the like), and so forth may be cited. Alternatively, parameters (a pitch angle, a roll angle, angular velocities thereof, and so forth) relating to an attitude of a vehicle body, lateral acceleration, a steering angle of steering, a floodlighting state (an on/off state, a floodlighting angle, or the like), an actuation state of a wiper, and so forth may also be cited. In addition, as specific examples of the state information, a running distance of the vehicle (a cumulative distance, an interval distance, or the like), the amount of fuel (a remaining amount, the amount of consumption, or the like), the amount of a battery (a remaining amount, the amount of consumption, or the like), time information of an in-vehicle clock, ID information for identifying a driver, and so forth may be cited.

[2. System Configuration]

FIG. 1 is a diagram illustrating the configuration of a driving diagnosis system according to an embodiment. Here, a distributed processing driving diagnosis system will be described where a server 10 diagnoses a driving behavior of a driver driving a vehicle 30. As a specific example of the vehicle 30 driven by the driver to serve as a diagnosis target, an automobile, a bus, a truck, a streetcar, a cab, a two-wheeled vehicle, or the like may be cited, and an intended purpose such as personal use or business use is ignored.

A server 10 (driving diagnosis device) is a large-sized electronic computer including a processor such as a central processing unit (CPU) or a micro processing unit (MPU), a read only memory (ROM), a random access memory (RAM), a storage device, and so forth. This server 10 has a function for receiving various kinds of information acquired on a vehicle 30 side and diagnosing the driving behavior of the driver, based on these pieces of information. It is assumed that an installation location of the server 10 belongs to, for example, a holder of the vehicle 30, an administrator, a provider of an operational service of the vehicle 30, a provider of a diagnosis service, or the like.

The server 10 is coupled to, for example, a network 40 accessible from the vehicle 30 side, and provided so that it becomes possible for the server 10 and the vehicle 30 to communicate with each other through the network 40. The network 40 is a computer network including Internet, a wireless communication network of mobile phone devices, another digital wireless communication network, and so forth, and realizes transmission/reception of information, based on a predetermined technical standard. Hereinafter, it is called on-line diagnosis to transmit information relating to an operational state of the vehicle 30 using communication through the network 40 to the server 10 during operation of the vehicle 30 and perform diagnosis.

In addition, alternatively, a mechanism may be adopted where information from the vehicle 30 side is transmitted to the server 10 through a portable recording medium 39, in place of the network 40. In other words, a recording device for the recording medium 39 may be provided on the vehicle 30 side, and a reading device for the recording medium 39 may be provided on a server 10 side. In this case, the recording medium 39 into which information relating to the operational state of the vehicle 30 is written may be transported using an arbitrary mechanism, and the server 10 may be caused to read the information of the recording medium 39. As specific examples of the recording medium 39, an optical disk, a flash memory, and so forth are cited. Hereinafter, it is called off-line diagnosis to perform diagnosis in the server 10 after the operation of the vehicle 30, based on information transmission through the recording medium 39.

In addition, it may be preferable to perform not only one of the on-line diagnosis and the off-line diagnosis but also diagnosis where these are combined. For example, in order to reduce a traffic load of the network 40, simplified diagnosis may be performed in the on-line diagnosis, using a portion of information relating to the operational state of the vehicle 30, and detailed diagnosis may be performed in the off-line diagnosis thereafter.

[3. Vehicle Configuration]

[3-1. In-Vehicle Device]

The vehicle 30 is provided with a GPS device 31, a camera 32, an electronic control device 33, and various kinds of sensors 41 to 45. The GPS device 31 receives positioning signals (pieces of time information of clocks mounted in a plurality of GPS satellites) transmitted from the GPS satellites, and acquires positioning information corresponding to a current position of the vehicle 30. Here, positioning information is acquired that corresponds to an absolute position (a position specified by latitude, longitude, and altitude) in such as a coordinate system (global coordinate system) based on a reference ellipsoid. In addition, the GPS device 31 has a function for acquiring current time information of the vehicle 30, based on the pieces of time information included in the positioning signals. The positioning information and the current time information obtained in this manner are transmitted to the electronic control device 33.

The camera 32 is a video camera shooting an image around the vehicle 30 as a moving image. The moving image shot here includes, for example, a plurality of successive still images, and information of image data and shooting times included in the still images is as needed transmitted to the electronic control device 33. An image shot by the camera 32 is used for recognizing a pavement marking or a surrounding fixed structure and for understanding a position relative to the vehicle 30 when the vehicle 30 passes through an intersection. In place of the camera 32, a radar device, a laser sensor, or the like may be mounted that detects an object existing around the vehicle 30.

[3-2. Electronic Control Device]

The electronic control device 33 such as an electronic control unit (ECU) is a computer including a processor such as a CPU or an MPU and a storage device such as a ROM or a RAM. Through a communication line of an in-vehicle network provided in the vehicle 30, the electronic control device 33 is coupled to other electronic control devices, for example, an engine ECU, a brake ECU, a transmission ECU, and so forth so as to be able to communicate with each other. Various kinds of information used for diagnosis implemented in the server 10 are aggregated in the electronic control device 33 through the in-vehicle network.

A hardware configuration of the electronic control device 33 is exemplified in FIG. 1. In the electronic control device 33, a central processing unit 51, a main storage device 52, an auxiliary storage device 53, and an interface device 54 are provided, and these are coupled each other so as to be able to communicate through a bus 55. The central processing unit 51 is a processing device (processor) embedding therein a control unit (control circuit), a computing unit (computing circuit), a cache memory (register group), and so forth. The main storage device 52 is a memory device in which a program and active data are stored, and, for example, the above-mentioned RAM and ROM are included therein. On the other hand, the auxiliary storage device 53 is a memory device for storing data and a program which are held on a longer-term basis than the main storage device 52, and a storage device such as, for example, a flash memory, a hard disk drive (HDD), or a solid state drive (SSD) is included in the auxiliary storage device 53.

The interface device 54 manages input/output (I/O) operation between the electronic control device 33 and an external device. For example, transmission and reception of information between various kinds of sensors mounted in the vehicle or various kinds of in-vehicle control devices and the electronic control device 33 are performed through the interface device 54. Transmission and reception of information between the electronic control device 33 and the server 10 are also performed through the interface device 54.

The communication line of the in-vehicle network is coupled to the vehicle speed sensor 41, the wheel speed sensor 42, the acceleration sensor 43, the yaw rate sensor 44, the engine rotation number sensor 45, and so forth. The vehicle speed sensor 41 detects a vehicle speed V, and is provided on, for example, a power transmission means of the vehicle 30. The wheel speed sensor 42 detects a wheel speed W (an angular velocity of an axle), and is provided such as in the vicinity of an axle of a drive wheel. Since the product of the wheel speed W and time corresponds to a travel distance of a wheel, a detailed travel distance L of the vehicle 30 is calculated using the wheel speed W in the present embodiment. The detailed travel distance L may be defined as a distance where the vehicle 30 has moved per unit time, or alternatively, may be a distance where the vehicle 30 has moved during an arbitrary time (for example, a time from a previous calculation time to a current time).

The acceleration sensor 43 detects acceleration X in a front-back direction, which acts on the vehicle 30. In addition, the yaw rate sensor 44 detects a yaw rate Y of the vehicle 30, and the engine rotation number sensor 45 detects an engine rotation number Ne per unit time. Individual pieces of information including the vehicle speed V, the wheel speed W, the acceleration X, the yaw rate Y, and the engine rotation number Ne, detected by the various kinds of sensors 41 to 45, are transmitted to the electronic control device 33 through the communication line. Alternatively, these various kinds of sensors 41 to 45 and the electronic control device 33 may be directly coupled to each other using signal lines.

The above-mentioned electronic control device 33 aggregates pieces of information transmitted from the GPS device 31, the camera 32, and the various kinds of sensors 41 to 45, and performs control for recording information relating to the operational state of the vehicle 30 as driving record data. As computing elements for implementing such control, the electronic control device 33 is provided with a vehicle position identification unit 34, a vehicle information acquisition unit 35, a driving information management unit 36, a driving information storage unit 37, and a driving information interface unit 38. These individual elements may be realized by an electronic circuit as hardware, or may be subjected to programming as software. Alternatively, part of functions thereof may be provided as hardware, and other part thereof may be software.

Figure 2:
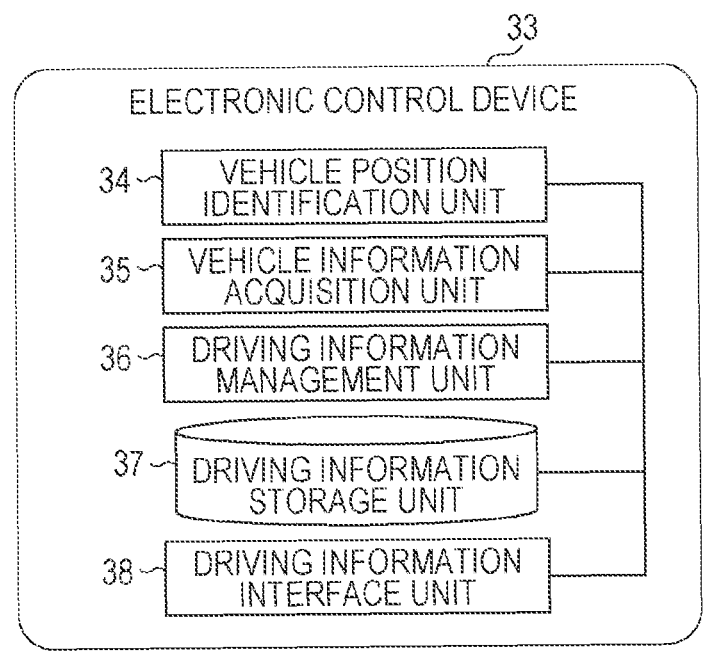
FIG. 2 is a diagram exemplifying a block configuration of an electronic control device mounted in a vehicle.

A block configuration of the electronic control device 33 in the present embodiment is exemplified in FIG. 2. The vehicle position identification unit 34, the vehicle information acquisition unit 35, the driving information management unit 36, and the driving information interface unit 38 are given as software recorded within the auxiliary storage device 53. These pieces of software are read into the central processing unit 51 and executed by using the main storage device 52 as a working memory. The driving information storage unit 37 is recorded, as a database, within the auxiliary storage device 53, or corresponds to software taking charge of reading or writing relating to a specific area for information recorded within the auxiliary storage device 53, the auxiliary storage device 53 (hardware), or the database.

The vehicle position identification unit 34 identifies a vehicle position and a traveling direction on map information. Here, the map information of a road through which the vehicle 30 is able to travel is preliminarily recorded. The vehicle position identification unit 34 identifies the vehicle position such as latitude and longitude), based on the positioning information transmitted from the GPS (global positioning system) device 31. The traveling direction is identified based on a direction of change in the vehicle position. The pieces of information of the vehicle position and the traveling direction identified are transmitted to the driving information management unit 36. Hereinafter, the pieces of information of the vehicle position and the traveling direction are collectively called vehicle position information.

The vehicle position may be identified using an electric field intensity of a wireless communication network, in place of the positioning information in the GPS device 31. For example, a position, an output characteristic, and so forth of a wireless base station of a mobile phone device or a base station of a wireless local area network are preliminarily acquired. In addition, using a wireless reception device, the electric field intensity of the wireless communication network is measured, and measurement information thereof is transmitted to the electronic control device 33. Since the electric field intensity is inversely proportional to a distance from a radio wave radiation source, it becomes possible to identify the vehicle position by measuring electric field intensities from a plurality of wireless base stations. Identification accuracy of the vehicle position increases with an increase in measurement accuracy of an electric field intensity and an increase in the number of captured wireless base stations.

Alternatively, based on map-matching processing utilizing the vehicle speed V, the acceleration X, the yaw rate Y, and so forth of the vehicle 30 and the map information, a position on a map, at which the vehicle 30 is estimated to be travelling, may be identified as the vehicle position. Alternatively, using a car navigation system for a vehicle, independent from the GPS device 31 or the electronic control device 33, a mobile phone device, a smartphone, or the like equipped with application having a navigation function, the vehicle position may be identified.

The vehicle information acquisition unit 35 acquires the behavior information and the state information of the vehicle 30, transmitted from various kinds of ECUs and the various kinds of sensors 41 to 45 mounted in the vehicle 30. The behavior information and the state information are acquired through, for example, the communication line of the in-vehicle network or through the signal lines coupling the various kinds of sensors 41 to 45 and the electronic control device 33 to each other. Here, as pieces of the behavior information, at least the above-mentioned individual pieces of information including the vehicle speed V, the wheel speed W, the acceleration X, the yaw rate Y, and the engine rotation number Ne are acquired, and the detailed travel distance L of the vehicle 30 is calculated based on the wheel speed W.

It may be preferable to acquire, as the other pieces of the behavior information, the accelerator position, the throttle position, the brake actuation state (the amount of a step-in operation of a brake pedal, brake fluid pressure, or the like). Alternatively, it may be preferable to acquire the parameters (the pitch angle, the roll angle, the angular velocities thereof, and so forth) relating to the attitude of the vehicle body, the lateral acceleration, the steering angle of steering, the floodlighting state, the actuation state of a wiper, and so forth. As pieces of the state information, it may be preferable to acquire the running distance of the vehicle 30 (a cumulative distance, an interval distance, or the like), the amount of fuel (a remaining amount, the amount of consumption, or the like), the amount of the battery (a remaining amount, the amount of consumption, or the like), the time information of the in-vehicle clock, the ID information for identifying the driver, and so forth. The behavior information and the state information are transmitted to the driving information management unit 36. Hereinafter, the behavior information and the state information are collectively called vehicle information.

The driving information management unit 36 manages the vehicle position information identified in the vehicle position identification unit 34 and the vehicle information acquired in the vehicle information acquisition unit 35 with associating the time information with the vehicle position information and the vehicle information. In a case where the ID information of the driver has been acquired in the vehicle information acquisition unit 35, the ID information may be managed along therewith. The time information associated therewith may be, for example, the current time information acquired in the GPS device 31, or may be the time information of the in-vehicle clock, acquired in the vehicle information acquisition unit 35. Hereinafter, the vehicle information associated with the time information is called driving information.

The driving information storage unit 37 records and stores, in the auxiliary storage device 53, the driving information managed in the driving information management unit 36. A driving record database is recorded that includes at least a record of vehicle information and time information which is indicative of the time at which the vehicle information has been acquired. A table of the driving record database recorded in the driving information storage unit 37 is exemplified in FIG. 4. In this table, fields of time, the vehicle position (latitude and longitude), the detailed travel distance L, the vehicle speed V, the acceleration X, the yaw rate Y, and so forth are defined.

The information of the vehicle position is used for identifying an intersection and a traveling direction in a diagnosis target intersection identification unit 22 described later. In addition, individual pieces of information including the detailed travel distance L, the vehicle speed V, the acceleration X, and the yaw rate Y are used for generation of the actual running information in a detailed distance-speed correlation data generation unit 23 described later. In addition, in some cases, as for the information of the vehicle speed V, the degree of accuracy in, for example, a low-speed area before or after the vehicle 30 stops is reduced. On the other hand, the information of the detailed travel distance L is a value corresponding to a rotation angle of a wheel, and the degree of accuracy is rarely reduced even in the low-speed area. Accordingly, a detailed vehicle speed may be calculated based on the detailed travel distance L and the time, and the detailed vehicle speed may be used in place of the vehicle speed V in the low-speed area.

In addition, the detailed travel distance L in the present embodiment is a parameter used only for driving diagnosis, and, in other words, a parameter for understanding the position of the vehicle 30 on the periphery of an intersection with a high degree of accuracy. Form this, when the vehicle 30 does not pass through the periphery of an intersection, calculation of the detailed travel distance L may be halted. In other words, in the driving record database illustrated in FIG. 4, in a record where coordinates of the vehicle position are not located on the periphery of an intersection, the information of the detailed travel distance L may be omitted. In addition, as judgment of whether or not the coordinates of the vehicle position are located on the periphery of an intersection, determination may be performed based on the map information recorded in the vehicle position identification unit 34, or determination may be performed based on a shot image in the camera 32.

The driving information interface unit 38 functions as an interface (IF) for transmitting and receiving information between the vehicle 30 and the server 10. In a case where the server 10 implements the on-line diagnosis, a wireless communication device (for example, a communication device of public wireless communication, short-distance wireless communication utilizing an access point of public wireless, or the like) is provided as the driving information interface unit 38, the wireless communication device coupling the electronic control device 33 to a wireless communication network. The driving information interface unit 38 transmits, onto the network 40, information (driving information) of an operation record database recorded in the driving information storage unit 37, and transmits to the server 10 side.

On the other hand, in a case where the server 10 implements the off-line diagnosis, a reading/writing device or the like for writing and reading information into and from the portable recording medium 39 is provided as the driving information interface unit 38. The driving information interface unit 38 records, in the recording medium 39, the information (driving information) of the operation record database recorded in the driving information storage unit 37.

[4. Server Configuration]

A hardware configuration of the server 10 is exemplified within FIG. 1. In the server 10, a central processing unit 61, a main storage device 62, an auxiliary storage device 63, and an interface device 64 are provided, and these are coupled so as to be able to communicate through a bus 65.

The central processing unit 61 is a processing device (processor) embedding therein a control unit (control circuit), a computing unit (computing circuit), a cache memory (register group), and so forth. In addition, the main storage device 62 is a memory device in which a program and active data are stored, and, for example, the above-mentioned RAM and ROM are included therein. On the other hand, the auxiliary storage device 63 is a memory device where data and a program are stored that are held on a longer-term basis than the main storage device 62, and a storage device such as, for example, a flash memory, a hard disk drive (HDD), or a solid state drive (SSD) is included therein. In addition, the interface device 64 manages input/output (I/O) between the server 10 and an external device. For example, transmission and reception of information between the electronic control device 33 and the server 10 are performed through the interface device 64.

[4-1. Output/Storage]

Figure 3:
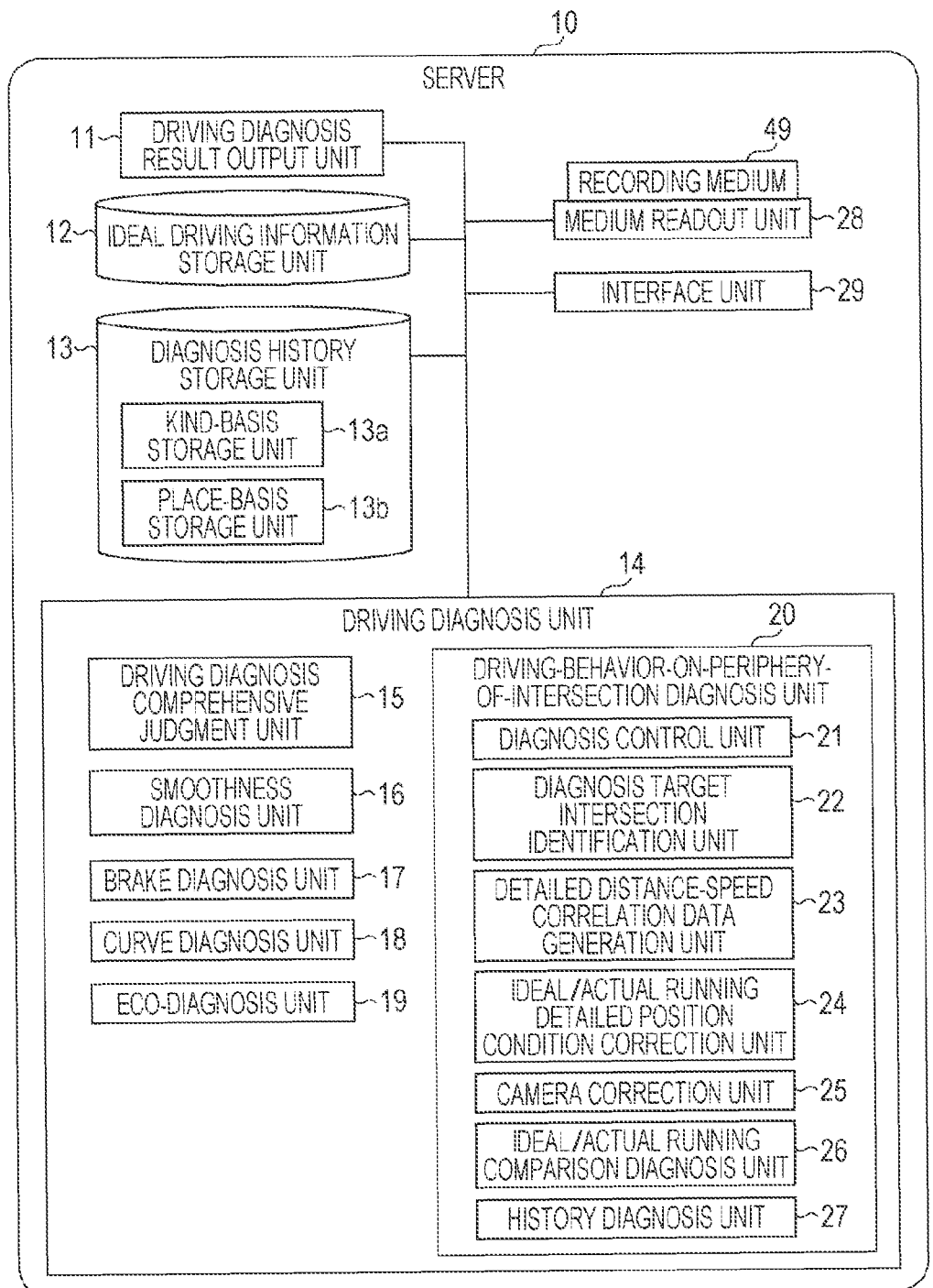
FIG. 3 is a diagram exemplifying a block configuration of a server.

FIG. 3 is a block diagram for explaining processing contents executed in the server 10. These processing contents are recorded, as, for example, an application program, in the auxiliary storage device 63 or a removable medium, implemented within a memory space within the main storage device 62, and executed in the central processing unit 61.

In the server 10, a driving diagnosis result output unit 11, an ideal driving information storage unit 12, a diagnosis history storage unit 13, a driving diagnosis unit 14, a medium readout unit 28, and an interface unit 29 are provided. These individual elements are provided so as to be able to communicate with one another through an internal bus (a communication line or a signal line). In addition, these individual elements may be realized using electronic circuits (hardware), or may be subjected to programing as software. Alternatively, part of functions thereof may be provided as hardware, and other part thereof may be software.

The driving diagnosis result output unit 11 outputs and feeds back a diagnosis result of a driving behavior to the driver, and, for example, an image display device (display), an acoustic device, or a printing device corresponds thereto. The diagnosis result output here may be, for example, all diagnosis results in the driving diagnosis unit 14 described later, or may be a portion of diagnosis results (only a prioritized portion). A specific case example of an output content will be described later using FIG. 10.

The ideal driving information storage unit 12 (a storage unit) stores therein the ideal running information to serve as the evaluation criterion of a driving behavior, and is, for example, a storage device such as a flash memory, an HDD, or an SSD. The ideal driving information storage unit 12 is recorded, as a database, within the auxiliary storage device 63, or corresponds to software taking charge of reading or writing relating to a specific area for information recorded in the auxiliary storage device 63, the auxiliary storage device 63 (hardware), or the database. There is recorded here the ideal running information where a relationship between a vehicle speed and a position, which is to serve as a criterion when the vehicle 30 passes through an intersection.

There are various kinds of forms for a specific form of the ideal running information. For example, a form may be adopted that is expressed by a rule associating the running condition and a behavior of the vehicle 30 with each other, or alternatively, a form may be adopted that is able to directly compare with an actual behavior of the vehicle 30. In the former case, it may be diagnosed whether or not the information of the operation record database complies with the rule. On the other hand, in the latter case, a vehicle speed and a position may be preliminarily described that correspond to an ideal passage pattern with respect to each intersection.

In the latter case, individual intersections may be classified into a plurality of patterns whose number is relatively small, in accordance with the features of the intersections, and a vehicle speed and a position may be preliminarily described with respect to each pattern. Alternatively, as ideal driving data, exemplary running data may be used. The term "exemplary running data" here may be predetermined data preliminarily set based on driving of a driver whose driving skill is high, or may be arbitrarily alterable data set based on actual driving of a user of the vehicle 30.

In the present embodiment, as illustrated in FIG. 5, information of a position (latitude and longitude) of an intersection expressed in the same coordinate system as that of the vehicle position is preliminarily defined, and a relationship between an ideal vehicle speed and a position depending on an approaching direction to the intersection is defined as the ideal running information. The information of the "position" included in the ideal running information is expressed by a relative distance from a reference point set with respect to each intersection. It is suitable to adopt an intersection center, an intersection boundary, a temporary stop line, or the like as the reference point. From among these, the position of the intersection boundary or the temporary stop line may be changed due to partial construction such as expansion or improvement of a sidewalk or a side strip, improvement of an intersection angle, or a change of a temporary stop position. However the position of an intersection center is not changed as long as an entire intersection is not reconstructed. Accordingly, it is desirable that the intersection center is used as the reference point.

A relationship between an ideal vehicle speed and a position is described as a relationship between a relative distance with respect to an approaching direction to an intersection and an ideal speed at a spot thereof. Data of the relative distance includes data of a position where the ideal speed becomes "0" or less than or equal to a predetermined value near "0" (in other words, a position where it is desirable that the vehicle 30 temporarily stops). For example, data of a position corresponding to the position of a temporary stop line, a position with right and left vehicles visible, a traffic lane boundary position, or the like is included. In addition, in the ideal running information illustrated in FIG. 5, data other than positions where it is desirable that the vehicle 30 temporarily stops is not illustrated.

The "position where it is desirable that the vehicle 30 temporarily stops" is set in accordance with the structure and visibility of an intersection as illustrated in FIG. 6. A minimum isolation distance L1 or minimum safety minimum distance L1 is defined as a distance over which a vehicle takes equal to or less than a certain seconds such as three seconds to meet to a pedestrian walking or a person riding a bicycle on a sidewalk, and a minimum isolation distance L2 or minimum safety minimum distance L2 is defined as a distance over which the vehicle takes equal to or more than a certain seconds such as three seconds to meet to another vehicle travelling on a roadway.

A $P_1$ spot in FIG. 6 corresponds to the position of a vehicle front end in a state where a driver is able to confirm the presence or absence of a bicycle existing within a range nearer an intersection than the minimum isolation distance $L_1$ on a right sidewalk. In other words, the $P_1$ spot corresponds to a position with the right sidewalk visible within the range of the minimum isolation distance $L_1$. In the same way as this, a $P_4$ spot corresponds to a position with a left sidewalk visible within the range of the minimum isolation distance $L_1$. In addition, a $P_3$ spot and a $P_5$ spot correspond to a position with a left road visible within the range of the minimum isolation distance $L_2$ and a position with a right road visible within the range of the minimum isolation distance $L_2$, respectively. A $P_2$ spot, a $P_6$ spot, and a $P_7$ spot correspond to the position of a temporary stop line, the position of an intersection boundary (a boundary between a running lane of the self-vehicle and a sidewalk), and the position of a traffic lane boundary (a boundary between roadways), respectively.

The ideal running information recorded in the ideal driving information storage unit 12 is set so that ideal speeds at up to seven kinds of positions described above become "0" or less than or equal to a predetermined value near "0". In this regard, however, visibility of a sidewalk or a roadway is not poor at all intersections, and a position where it is desirable that the vehicle 30 temporarily stops varies depending on each intersection or each approaching direction. Accordingly, a relationship between an ideal vehicle speed and a position defined within the ideal running information varies with respect to each intersection or each approaching direction. In the present embodiment, such a relationship between an ideal speed and a position as illustrated in FIG. 5 is set with respect to each intersection ID.

A $P_0$ spot illustrated in FIG. 6 corresponds to a spot where deceleration is started so as to cause the vehicle 30 to temporarily stop at the temporary stop line (the $P_2$ spot). The range of relative distance information recorded in the ideal driving information storage unit 12 includes at least the temporary stop line (the $P_2$ spot), and preferably includes the above-mentioned $P_1$ to $P_7$ spots. In the present embodiment, information on a range from the $P_o$ spot to an intersection center $P_C$ illustrated in FIG. 6 is defined, and a driving behavior within the range is a target of diagnosis.

The graphic representation of a relationship between an ideal vehicle speed and position is exemplified by a solid line in FIG. 7A. In the ideal driving information storage unit 12, a relationship between a vehicle speed and a position corresponding to such a graph is recorded with respect to each intersection or each approaching direction. In a case where seven "positions where it is desirable that the vehicle 30 temporarily stops" exist, a speed (ideal speed) becomes "0" or less than or equal to a predetermined value near "0" at up to seven points on the graph.

As described, in diagnosis of a driving state at an intersection, the ideal driving information based on a "position where it is desirable that the vehicle 30 temporarily stops" is used. On the other hand, in a road other than an intersection, in some case, a "position where it is desirable that the vehicle 30 temporarily stops" does not serve as a basis. For example, the vehicle 30 usually does not temporarily stop usually during the time of running on a ramp way. Accordingly, in a case where a driving state on the ramp way is diagnosed, it is preferable to use the ideal driving information based on a running speed corresponding to the shape of the ramp way or the speed limit of an automobile road connected to the ramp way.

The diagnosis history storage unit 13 (a second storage unit 13a, a third storage unit 13b in FIG. 3) cumulatively stores therein a diagnosis result in the driving diagnosis unit 14 described later, and is, for example, a storage device such as a flash memory, an HDD, or an SSD. In addition to a diagnosis result of a driving behavior output by the driving diagnosis result output unit 11, intermediate processing information is recorded also on the unit 13, where the intermediate is information used for performing history diagnosis in the individual diagnosis units included in the driving diagnosis unit 14 to trace diagnosis processes in the individual diagnosis units.

A diagnosis result in the driving-behavior-on-periphery-of-intersection diagnosis unit 20 has been obtained is recorded in association with an intersection ID corresponding to an intersection and an approaching direction to which the diagnosis result is related. In addition, the diagnosis result is recorded in association with a position at which the vehicle 30 has actually temporarily stopped is associated with a kind of a temporary stop position (such as a temporary stop line, an intersection boundary, or a position with good visibility to be recorded). In addition to the diagnosis result of a driving behavior, the driving information transmitted from the driving information interface unit 38 may be recorded along therewith. Owing to this, it may become easy to diagnose the driving behavior again or to check a diagnosis process.

The diagnosis history storage unit 13 is provided with a function as a kind-basis storage unit 13a (the second storage unit) storing therein a diagnosis result with respect to each kind of a temporary stop position and a function as a place-basis storage unit 13b (the third storage unit) storing therein a diagnosis result with associating the diagnosis result with an intersection. The kind-basis storage unit 13a stores information of the kind of a temporary stop position such as a temporary stop line, a position with a left vehicle visible, a position with a right vehicle visible, or a traffic lane boundary position in association with a diagnosis result. On the other hand, the place-basis storage unit 13b stores the intersection ID in association with a diagnosis result. It is possible to create one database by associating both the information of the kind of a temporary stop position and the intersection ID with one diagnosis result.

The medium readout unit 28 imports thereto information stored in a recording medium 49 detachable from the server 10. The medium readout unit 28 is such as an optical drive implementing read/write of a removable medium, a memory reader/writer, a cradle device (an HDD cradle or an SSD cradle) for an external storage device, or the like. An application program for diagnosis control implemented in the driving diagnosis unit 14 is written onto the recording medium 49, and this is read from the medium readout unit 28 to the server 10, and executed in the driving diagnosis unit 14. In addition, as for the above-mentioned recording medium 39 used at the time of the off-line diagnosis, it is assumed that the information thereof is able to be read by the medium readout unit 28.

The interface unit 29 functions as an interface for transmitting and receiving information between the vehicle 30 and the server 10. In a case where the server 10 performs the on-line diagnosis, a wireless communication device coupling the server 10 to a wireless communication network is provided as the interface unit 29. The interface unit 29 receives driving information transmitted from the vehicle 30 through the network 40, and transmits the driving information to the driving diagnosis unit 14. On the other hand, in a case where the server 10 performs the off-line diagnosis, it is provided a reading/writing device or the like for writing and reading the information of the recording medium 39 as the interface unit 29.

The interface unit 29 also functions as an interface for transmitting a diagnosis result in the driving diagnosis unit 14 to the outside. For example, information of a diagnosis result is transmitted onto the network 40 through the interface unit 29, and transmitted to the vehicle 30 side. In other words, the above-mentioned diagnosis result as illustrated in FIG. 10 is able to be output to not only the server 10 side but also the in-vehicle display, the in-vehicle speaker, or the like on the vehicle 30 side.

[4-2. Driving Diagnosis]

The application program read by the medium readout unit 28 is implemented on a memory within the driving diagnosis unit 14, not illustrated, to be executed. In the driving diagnosis unit 14, various kinds of diagnoses are performed based on actual driving information transmitted from the driving information interface unit 38 and the ideal running information recorded in the ideal driving information storage unit 12. An application program is implemented on the memory and functions as each of a driving diagnosis comprehensive judgment unit 15, a smoothness diagnosis unit 16, a braking, diagnosis unit 17, a curve diagnosis unit 18, an eco-diagnosis unit 19, and a driving-behavior-on-periphery-of-intersection diagnosis unit 20.

The driving diagnosis comprehensive judgment unit 15 determines a comprehensive diagnosis result on the basis of diagnosis results in the individual diagnosis units 16 to 20 included in the driving diagnosis unit 14, and outputs the comprehensive diagnosis result to the driving diagnosis result output unit 11. The diagnosis results in the individual diagnosis units 16 to 20 are aggregated in the driving diagnosis comprehensive judgment unit 15, and recorded in the diagnosis history storage unit 13 along with the comprehensive diagnosis result and the intermediate processing information. The comprehensive diagnosis result is transmitted to the driving diagnosis result output unit 11 or transmitted to the vehicle 30 side through the interface unit 29.

The smoothness diagnosis unit 16 diagnoses or evaluates quality relating to the smoothness of a motion of the vehicle 30. That is, a quantitative evaluation is performed on the presence or absence of a rapid change in the acceleration X, the vehicle speed V, the yaw rate Y, or the like. For example, as the frequency of rapid acceleration or rapid deceleration of the vehicle 30 decreases, an action is evaluated as smooth and the driving behavior of a driver is evaluated as good. In addition, in a case where the vehicle 30 is running on an expressway or an automobile road with a fixed speed, the driving behavior of a driver is evaluated as good, as the fluctuation in the vehicle speed V decreases.

The braking diagnosis unit 17 diagnoses quality relating to a brake operation of the vehicle 30. An evaluation is performed quantitatively on the presence or absence of a rapid change in the acceleration X, the vehicle speed V, a brake actuation state, or the like. For example, as the frequency of rapid deceleration decreases at the time of deceleration or stop of the vehicle 30 and a change in the vehicle speed V becomes smooth, the driving behavior of a driver is evaluated as good.

The curve diagnosis unit 18 diagnoses the quality of a behavior when the vehicle 30 passes through a curved road. Here, an evaluation is performed qualitatively on the adequateness of the acceleration X, the vehicle speed V, the yaw rate Y, or the like. For example, as the lateral acceleration or the yaw rate Y at the time of passing through the curved road becomes small, the driving behavior of a driver is evaluated as good.

The eco-diagnosis unit 19 diagnoses the quality of the fuel consumption efficiency of the vehicle 30. Here, it is quantitatively evaluated whether or not the driving of a driver is driving whose fuel consumption efficiency is good on the basis of the acceleration X, the vehicle speed V, the amount of fuel consumption, a running distance, or the like. For example, the lower the frequency of rapid acceleration or rapid deceleration is and the smaller a speed fluctuation is, the better the fuel consumption efficiency is evaluated and the better the driving behavior of a driver is evaluated. In addition, in consideration of information relating to the state of a transmission, it may be evaluated whether or not the combination of the vehicle speed V and a shift position of the transmission is a combination whose fuel efficiency is good.

[4-3. Driving-Behavior-On-Periphery-Of-Intersection Diagnosis Unit]

The driving-behavior-on-periphery-of-intersection diagnosis unit 20 diagnoses a driving behavior when the vehicle 30 has passed through an intersection. A diagnosis here is a diagnosis implemented after the vehicle 30 has passed through the intersection. As illustrated in FIG. 1, the driving-behavior-on-periphery-of-intersection diagnosis unit 20 is provided with a diagnosis control unit 21, the diagnosis target intersection identification unit 22, the detailed distance-speed correlation data generation unit 23, an ideal/actual running detailed position condition correction unit 24, a camera correction unit 25, an ideal/actual running comparison diagnosis unit 26, and a history diagnosis unit 27.

The diagnosis control unit 21 controls other elements included in the driving-behavior-on-periphery-of-intersection diagnosis unit 20, manages and delivers information used in each element, and acquires a computing result in each element. The diagnosis target intersection identification unit 22 (an intersection identification unit) matches the vehicle position information (the information of a vehicle position and a traveling direction) included in the driving information against an intersection position included in the ideal running information, and identifies which intersection an intersection to serve as a diagnosis target is. Here, an intersection through which the vehicle 30 has passed and an approaching direction thereof are identified, and an intersection ID is acquired that corresponds to the intersection and the approaching direction. Information of the intersection ID acquired here is transmitted to the detailed distance-speed correlation data generation unit 23, the ideal/actual running detailed position condition correction unit 24, and the ideal/actual running comparison diagnosis unit 26.

The detailed distance-speed correlation data generation unit 23 (a generation unit) generates the actual running information indicating a relationship between the actual vehicle speed V and a position of the vehicle 30 on the basis of the individual pieces of information of the detailed travel distance L and the vehicle speed V included in the driving information. Here, the detailed distance-speed correlation data generation unit 23 generates the actual running information at an intersection identified in the diagnosis target intersection identification unit 22. It may be preferable to improve the degree of accuracy of the actual running information by using a combination of pieces of information such as the acceleration X, the yaw rate Y, the brake actuation state, and so forth included in the driving information.

In the same way as the ideal running information, the actual running information is generated in a range including a plurality of positions to stop at in at least an intersection to serve as a diagnosis target. For example, a range from the deceleration starting point (the $P_0$ position) for stopping at the temporary stop line (the $P_2$ position) located in front of the intersection within FIG. 6 to the intersection center $P_C$ (the intersection reference point) is defined as a diagnosis target range, and the actual running information within the range is generated. In addition, in consideration of a position identification error on the vehicle 30 side, the diagnosis target range may be magnified in a front-back direction, compared with this.

The ideal/actual running detailed position condition correction unit 24 (a condition identification unit) corrects a gap between the ideal running information relating to the intersection identified in the diagnosis target intersection identification unit 22 and the actual running information generated in the detailed distance-speed correlation data generation unit 23. Here, a matching condition where the strength of a correlation of the actual running information with the ideal running information (correlation in a distance direction) exceeds a predetermined value is identified. In other words, there is identified a matching condition where distributions of the position directions of information of a distance included in the actual running information and information of a distance included in the ideal running information become similar when the pieces of information of distances are matched against each other.

It is assumed that, at an intersection where the ideal running information corresponding to the solid line graph within FIG. 7A is given, a graph corresponding to the actual running information of a vehicle is given by a dashed line graph. When these are simply compared with each other, it appears that the actual running information is totally displaced in a horizontal axis direction and far removed from an ideal behavior. On the other hand, if such a displacement in the horizontal axis direction is derived from low position identification accuracy on the vehicle 30 side, there is a possibility that true actual running information is obtained by totally displacing the dashed line graph in the horizontal axis direction.

Even if the position identification accuracy on the vehicle 30 is low, when there are a plurality of spots for the vehicle 30 to stop at the time of passing through an intersection, it is considered that measurement errors with respect to distances between the plural spots. Therefore, in the present embodiment, the positional displacement of the entire dashed line graph is considered to correspond to a position identification error, and an operation is added that enhances correlation with the solid line graph by displacing the entire dashed line graph in a horizontal direction.

Specifically, a matching condition where a correlation between the solid line graph and the dashed line graph exceeds the predetermined value is identified. At this time, it is desirable that a condition where the correlation between the solid line graph and the dashed line graph becomes a maximum, to maximize the correlation is not a desired condition on computation, and it is assumed that the existence of a certain level of a high correlation is acceptable.

As an identification method for a specific matching condition, as illustrated in FIGS. 7A and 7B, it is conceivable to horizontally displace the dashed line graph so that a local minimum point A of the dashed line graph and a local minimum point B of the solid line graph coincide with each other. It is assumed that the local minimum points A and B are points where the individual graphs become local minimums for the first time within the diagnosis target range (alternatively, points where speeds become "0" for the first time). Here, both an ideal speed included in the ideal running information and the vehicle speed V included in the actual running information are regarded as functions of a relative distance p from the reference point and expressed as Vbest(p) and Vdata(p).

If a gap between the local minimum point A and the local minimum point B in a relative distance p direction is defined as d, a function Vnew(p) of the dashed line graph where the local minimum point A is caused to coincide with the local minimum point B is expressed in a form where (p−d) is substituted into the variable p of the Vdata(p). Accordingly, this function Vnew(p) may be identified as a vehicle speed Vdata(p) after correction. In this case, the value of the gap d in the relative distance p direction becomes a parameter corresponding to "the degree of correlation of the actual running information with the ideal running information". In addition, that "the gap d is less than a predetermined dimension" corresponds to the fact that "the degree of correlation exceeds the predetermined value".

In addition, since an error regarding to a distance between spots for the vehicle 30 to stop at is considered to be small, it is also conceivable to horizontally displace the dashed line graph so that individual local minimum points on the dashed line graph draw nigh to individual local minimum points on the solid line graph. In other words, in consideration of not only a gap of one local minimum point but also gaps of a plurality of local minimum points, the vehicle speed Vdata(p) after correction may be identified.

For example, a midpoint M between the individual local minimum points on the dashed line graph and a midpoint N between the individual local minimum points on the solid line graph may be obtained, and the horizontal displacement amount of the dashed line graph where a distance L between these midpoints M and N becomes less than a predetermined value may be obtained. In this case, the value of the distance L becomes a parameter corresponding to "the degree of correlation of the actual running information with the ideal running information". In addition, that "the distance L is less than the predetermined distance" corresponds to the fact that "the degree of correlation exceeds the predetermined value".

Alternatively, as illustrated in FIGS. 7C to 7E, a horizontal displacement amount may be obtained that minimizes an area S ($S=\int |Vbest(p)-Vdata(p)|dp$) surrounded by the solid line graph and the dashed line graph or the sum of squares of a difference ($\int \{Vbest(p)-Vdata(p)\}^2 dp$) when the dashed line graph is displaced in the horizontal direction, and this may be identified as the matching condition. It is desirable that the width of a range where the dashed line graph is displaced is set to a width corresponding to a supposed position error. For example, if the error of a vehicle position identified in the vehicle position identification unit 34 is ±Ep (for example, ±25 [m]), the displacement amount of the dashed line graph is also set to ±Ep (in other words, ±25 [m]).

In this case, the domain of definition of a variable e is defined as $-Ep \leq e \leq Ep$, (p+e) is substituted into the variable p of the Vdata(p), and the value of the variable e minimizing the value of $\int |Vbest(p)-Vdata(p+e)|dp$ is obtained. An integration interval is able to be arbitrarily set if being an interval independent of the variable e (an interval not to be changed if the value of the variable e is changed). For example, the integration interval may be set to an interval ($P_0-Ep$) to ($P_C+Ep$) based on the deceleration starting position $P_0$ and the intersection center $P_C$ within FIG. 6, or may be set to an interval $P_A$ to $P_B$ preliminarily set, as illustrated in FIGS. 7C to 7E.

As illustrated in FIG. 7E, in a case where the value of the variable e is $e_0$ when the area S of an overlapping portion becomes a minimum, the function Vnew(p) of the dashed line graph is expressed in a form where ($p-e_0$) is substituted into the variable p of the Vdata(p). Accordingly, this function Vnew(p) may be identified as the vehicle speed Vdata(p) after correction. In this case, the value of the area S surrounded by the solid line graph and the dashed line graph becomes a parameter corresponding to "the degree of correlation of the actual running information with the ideal running information". In addition, "the area S is less than a predetermined area" corresponds to the fact that "the degree of correlation exceeds the predetermined value". The matching condition identified here is transmitted to the camera correction unit 25.

The camera correction unit 25 (a second condition identification unit) recognizes the positions of a pavement marking and a fixed structure from an image of a vicinity around an intersection shot by the camera 32, and corrects the matching condition on the basis of the position of the pavement marking or the fixed structure relative to the vehicle 30. In a case where a pavement marking has been recognized on an image, the position of the vehicle 30 at the shooting time of the image is estimated from the shooting time thereof, the angle of view of the camera 32, the position of a recognized target on an image plane, and so forth.

Based on such shooting time information in the camera 32 and the position information of the vehicle 30, the camera correction unit 25 corrects the actual running information, in other words, the matching condition. Here, the corrected matching condition is transmitted to the ideal/actual running comparison diagnosis unit 26. In a case where it is difficult to estimate the position of the vehicle 30 even with the use of the information of the camera 32, the matching condition identified in the ideal/actual running detailed position condition correction unit 24 is transmitted to the ideal/actual running comparison diagnosis unit 26 without change.

As a pavement marking to serve as a recognition target, a specific symbol or character displayed at a specific position, such as a regulatory marking (a maximum speed, a route marking, or no U-turn), an instruction marking (a temporary stop line, a pedestrian crossing, or a pedestrian crossing ahead), may be cited. The same applies to a fixed structure to serve as a recognition target, and an object may be adopted if the position and shape thereof are identified in advance and the position thereof is rarely changed. For example, a road sign, a traffic light, a telephone pole, a signboard, a building whose shape is unique, a landmark, a guardrail, or the like may be cited. In addition, in a case where the vehicle 30 is equipped with a radar, a laser sensor, or the like in place of the camera 32, the actual running information is corrected based on the detection direction, the distance, and the detection time of a fixed structure detected by these, and the matching condition is corrected.

The ideal/actual running comparison diagnosis unit 26 (a stop position identification unit, a diagnosis unit) calculates the degree of similarity between the ideal running information and the actual running information under the matching condition identified in the ideal/actual running detailed position condition correction unit 24, and diagnoses the driving behavior (the skill, the degree of safety, and so forth of the driving behavior) of the driver, based on the degree of similarity. Here, for example, how similar the function Vdata(p) of the vehicle speed after being corrected by the ideal/actual running detailed position condition correction unit 24 and the camera correction unit 25 is to the ideal speed Vbest(p) is quantitatively evaluated. In other words, the degree of similarity between the actual running information after correction and the ideal running information is calculated, and the driving behavior of the driver is diagnosed based on the degree of similarity.

A diagnosis content is to diagnose the driving behavior on the basis of the degree of similarity at the temporary stop position which is determined as a position where the vehicle 30 has actually stopped by comparing the ideal running information and the actual running information under the above-mentioned matching condition with each other. For example, a position where the ideal speed Vbest(p) is "0" or less than or equal to a predetermined value near "0" is regarded as the temporary stop position of the vehicle 30, and it is diagnosed whether or not the vehicle 30 has actually temporarily stopped at the temporary stop position. In addition, it is diagnosed whether or not driving has been performed at reduced speed before and after the temporary stop or whether or not adequate stop has been performed at a position which is included in the ideal running information as a position at which a driver should stop to stop. Alternatively, the size of the gap (a shortage in a distance or a overrun distance) of the actual stop position with respect to an ideal stop position may be diagnosed.

When the actual stop position is located too short of the ideal stop position, the visibility for viewing a cross road in a right and left directions in respect to the subject vehicle becomes poor and it is less likely to perform safety confirmation, in some cases. In addition, when the subject vehicle passes the ideal stop position to stop at the actual stop position, there occurs the possibility of blocking passage of another vehicle or a pedestrian. Accordingly, it is desirable to diagnose that the driving behavior of the driver on the subject vehicle is good when the ideal stop position and the actual stop position approximately coincide with each other.

Figure 8A:
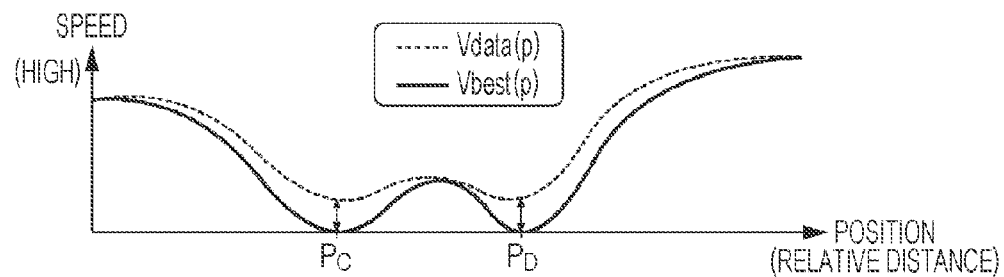
FIGS. 8A to 8C are graphs for explaining a calculation method for the degree of similarity.

A specific diagnosis method will be exemplified. As illustrated in FIG. 8A, the magnitudes of differences with respect to the vehicle speed Vdata(p) at positions $P_C$ and $P_D$ corresponding to the local minimum values of the ideal speed Vbest(p), |Vdata($P_C$)−Vbest($P_C$)| and |Vdata($P_D$)−Vbest($P_D$)| are calculated and the addition value thereof is calculated as the degree of similarity. With a decrease in the addition value, it is determined that the degree of similarity between the vehicle speed Vdata(p) and the ideal speed Vbest(p) is high and it is diagnosed that the degree of risk in the driving behavior is low. In addition, in place of calculating differences with respect to the vehicle speed Vdata(p) only at the positions $P_C$ and $P_D$ corresponding to the local minimum values of the ideal speed Vbest(p), differences with respect to the vehicle speed Vdata(p) in the vicinities of the two positions $P_C$ and $P_D$ may be calculated, and the integrated value thereof may be calculated as the degree of similarity.

Figure 8B:
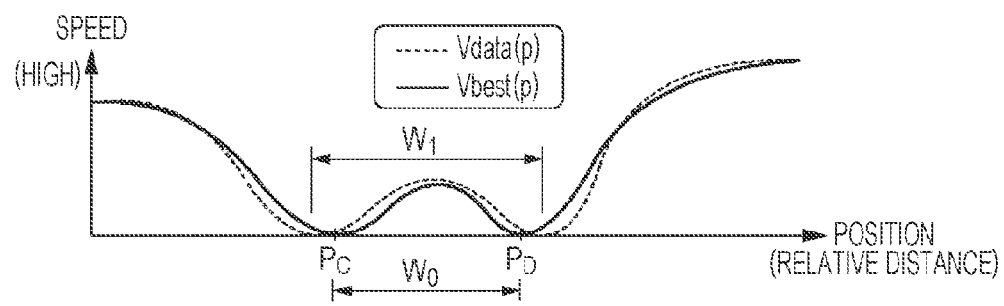
Figure 8C:
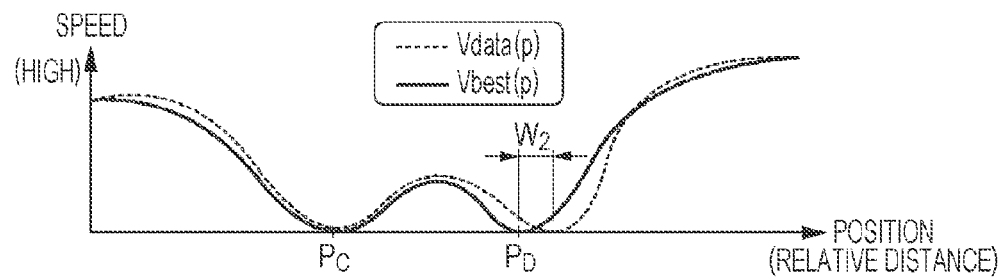

In addition, as illustrated in FIG. 8B, a distance $W_o$ between the positions $P_C$ and $P_D$ corresponding to the local minimum values of the ideal speed Vbest(p) may be calculated, and a distance $W_1$ between positions corresponding to the local minimum values of the vehicle speed Vdata(p) may be calculated. In addition to this, as a difference between these distances $W_0$ and $W_1$ decreases (or a ratio therebetween draws nigh to "1"), it may be determined that the degree of similarity is high. Alternatively, as illustrated in FIG. 8C, a difference $W_2$ between the position $P_D$ where the ideal speed Vbest(p) becomes "0" and a position where the vehicle speed Vdata(p) becomes "0" may be calculated, and with a decrease in the difference $W_2$, it may be determined that the degree of similarity is high. The difference $W_2$ corresponds to the overrun distance as an amount of protrusion of the vehicle from a position to temporarily stop at or the amount of shortage of distance in a forward movement to the position.

A diagnosis result here and the intermediate processing information obtained before the diagnosis has been performed are transmitted to the driving diagnosis result output unit 11 and the diagnosis history storage unit 13. Specific examples of the intermediate processing information are the intersection ID, the matching condition identified in the ideal/actual running detailed position condition correction unit 24, the actual running information after being corrected using the matching condition, the kinds of spots to stop at and stops at positions corresponding thereto, information of no stop, a protruded distance from an ideal stop position to an actual stop position, acceleration at the time of starting moving from a halting state, and so forth.

In the diagnosis history storage unit 13, a diagnosis result is stored with respect to each kind of a temporary stop position, and is stored with respect to each intersection. For example, as illustrated in FIG. 8A, there are recorded a fact that the vehicle 30 did not temporarily stop at a temporary stop line, the vehicle speed Vdata ($P_C$) at the time of passing through the temporary stop line, the vehicle speed Vdata ($P_D$) at the time of passing through an intersection boundary, and so forth are recorded. In addition, the intersection ID of an intersection at which a diagnosis result has been obtained is recorded with being associated with the diagnosis result.

In this way, the above-mentioned ideal/actual running comparison diagnosis unit 26 has a function as the stop position identification unit identifying the temporary stop position of the vehicle 30 by comparing the ideal running information and the actual running information with each other under the matching condition identified in the ideal/actual running detailed position condition correction unit 24. In addition to this, the ideal/actual running comparison diagnosis unit 26 has a function as the diagnosis unit diagnosing the driving behavior of the driver of the vehicle 30, based on the degree of similarity between the ideal running information and the actual running information under the matching condition. The above-mentioned diagnosis history storage unit 13 functions as the second storage unit (the kind-basis storage unit 13a) storing therein a diagnosis result in the ideal/actual running comparison diagnosis unit 26 with respect to each kind of a temporary stop position, and functions as the third storage unit (the place-basis storage unit 13b) storing therein a diagnosis result with respect to each intersection.

The history diagnosis unit 27 (a tendency diagnosis unit, a second tendency diagnosis unit) diagnoses the driving behavior of the driver, based on a historical diagnosis result recorded in the diagnosis history storage unit 13. Here, it is diagnoses whether a diagnosis result is due to the habit of the driver or accidental. In a case where a significant correlation between a diagnosis result and the running state of the vehicle 30 corresponding to the diagnosis result is not recognized, it is estimated that the diagnosis result is accidental.

On the other hand, in a case where the same diagnosis result has been obtained with respect to many intersections, it is estimated that the diagnosis result is a habitual one. In addition, in a case of being due to the habit of the driver, it is diagnosed what running condition such a habitual driving behavior is easy to occur in. The driving behavior with respect to, for example, the following three points is diagnosed.

whether or not a diagnosis result is dependent on the kind of a temporary stop position whether or not a diagnosis result is dependent on an intersection pattern whether or not a diagnosis result is observed only at a specific intersection For example, when diagnosis results is compared with respect to each kind of a temporary stop position (a kind such as a temporary stop line, a position with a left vehicle visible, a position with a right vehicle visible, or a traffic lane boundary position), the tendency of a diagnosis result with respect to each kind is understood. Owing to this, the tendency of the driving behavior, such as "there is a tendency not to sufficiently stop at a temporary stop line" or "there is a tendency to temporarily stop in such a way as to protrude from a position with right and left vehicles visible", is understood.

In addition, when diagnosis results are compared with respect to each pattern classified based on the feature of an intersection (a pattern such as an intersection between an arterial road and a branch road, an intersection between arterial roads, or an intersection between branch roads), a correlation between the diagnosis results with a specific intersection pattern is understood. Alternatively, by comparing diagnosis results with respect to each intersection frequently used by the driver, it is also possible to understand the correlation between the diagnosis results with only a specific intersection.

In this way, the history diagnosis unit 27 has a function as the tendency diagnosis unit diagnosing the tendency of the driving behavior with respect to each kind of a temporary stop position, based on a relationship between a diagnosis result (the history of temporary stop positions) and the kind of a temporary stop position. In addition, the history diagnosis unit 27 has a function of doubling as the second tendency diagnosis unit diagnosing the tendency of the driving behavior at each intersection, based on a relationship between a diagnosis result (a history with respect to individual intersections) and an intersection.

[4-4. Creation of Ideal Running Information]

As for the setting of the ideal running information to be recorded in the ideal driving information storage unit 12, as a method for defining a relationship between a vehicle speed and a position, there may be considered the relationship being to serve as a criterion at the time of passing through an intersection, a method (a first method) based on actual measurement of an intersection, a method (a second method) for semi-automatically creating based on a feature of an intersection, a method (a third method) for semi-automatically creating based on three-dimensional topographical information, or the like.

The first method is used for recording the driving behavior of a driver, such as a driving instructor of a driving school, who performs ideal driving. In this case, a relationship between an actual vehicle speed and an actual position at the time of passing through an intersection is measured, and information of an ideal speed and a relative distance from a reference point is acquired based thereon. Alternatively, the actual driving behavior of the user of the vehicle 30 is recorded, and the information of an ideal speed and a relative distance from a reference point may be acquired based thereon. In other words, after the user has been asked to perform exemplary driving, the driving behavior may be recorded.

It is desirable that measurement data is correctly aligned with an actual intersection shape. For example, it is conceivable to install a video camera in a vehicle or at an intersection to serve as a passage target so as to be able to discern a stop position or a running locus of the vehicle from a shot image. Owing to this, it is possible to correct the measurement data using a shot image, and it is possible to understand the relationship between the ideal speed and the relative distance with a high degree of accuracy.

Figure 9A:
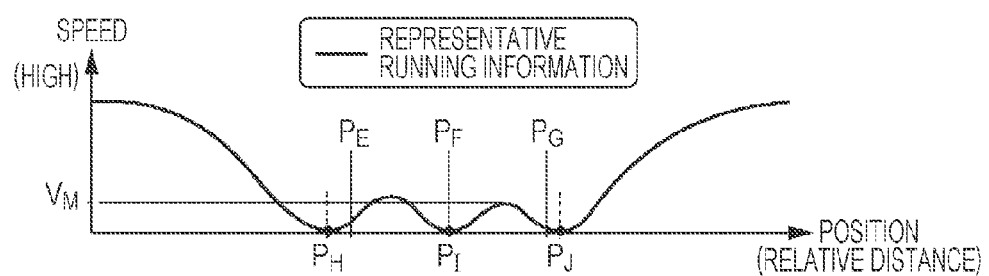
FIGS. 9A and 9B are graphs for explaining a creation method for the ideal running information.

In the second method, intersections are classified in accordance with the visibility for viewing a vehicle on the cross road or a pedestrian (a visual for viewing objects), a driving behavior is measured with respect to each classified group (an intersection pattern), and pieces of ideal running information at individual intersections are created based on an actual measurement result. As criteria of the classification, there are considered the visibility for viewing the cross road in a rightward and leftward directions from the subject vehicle, the dimension of a vehicle width, the shape of an intersection (a three-forked road, a crossroad, a five-forked road, to be obliquely crossed, or the like), the presence or absence of a signal, a direction where it is difficult to obtain good visibility, and so forth. In this case, when the number of classifications of intersections is, for example, one hundred, a relationship between an ideal speed and a relative distance is actually measured with respect to one hundred kinds of representative intersections, and this is created as representative running information, as illustrated in FIG. 9A. And then, the representative running information is corrected in accordance with the specific dimensions of individual intersection or a speed limit of a vehicle.

Figure 9B:
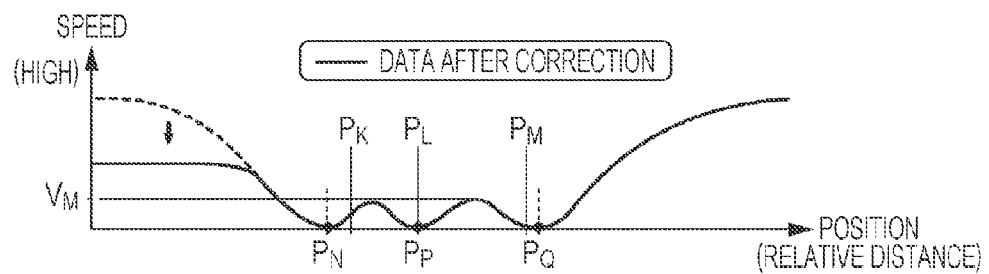

In other words, as illustrated in FIG. 9B, the maximum value of an ideal speed is reduced at an intersection where the speed limit thereof at the time of approaching is lower than a representative intersection. At this time, the rate of change (deceleration curve) of the ideal speed is not changed, and a same rate is maintained. In addition, in a case where a distance between a temporary stop line and an intersection boundary is different, the graph of a relative distance is adjusted in a scaling direction in accordance with the amount of the difference thereof, and a distance between positions where the ideal speed becomes "0" is corrected.

For example, in a case where a distance from a $P_H$ spot to a $P_I$ spot within FIG. 9A is shortened, the shape of an ideal speed graph from the $P_H$ spot to the $P_I$ spot is corrected in a reduction direction. In addition, in a case where a distance from the $P_I$ spot to a $P_3$ spot is extended, the shape of the ideal speed graph from the $P_I$ spot to the $P_J$ spot is corrected in an enlargement direction. In this regard, however, in this case, it is desirable that a maximum value $V_M$ of the ideal speed in an interval from the $P_I$ spot to the $P_J$ spot is maintained and the maximum value $V_M$ is avoided from becoming larger than that. In other words, it is desirable that the shape of the ideal speed graph from the $P_I$ spot to the $P_J$ spot is only magnified in a position direction.

In addition, in a case where positions within the representative running information (the $P_H$ spot, the $P_I$ spot, and the $P_J$ spot) where the ideal speed becomes "0" are different from actual temporary stop positions (a $P_E$ spot, a $P_F$ spot, and a $P_G$ spot), it is desirable that the amounts of the differences thereof are not changed and each of the amounts of differences is maintained. For example, the amount of a difference between the $P_H$ spot and the $P_E$ spot in FIG. 9A is caused to coincide with the amount of a difference between a $P_N$ spot and a $P_K$ spot in FIG. 9B. In the same way, a distance from the $P_I$ spot to the $P_F$ spot in FIG. 9A is caused to coincide with a distance from a $P_P$ spot to a $P_L$ spot in FIG. 9B, and a distance from the $P_J$ spot to the $P_G$ spot in FIG. 9A is caused to coincide with a distance from a $P_Q$ spot to a $P_M$ spot in FIG. 9B. In this way, by maintaining the amounts of differences between positions where the ideal speed becomes "0" and the actual temporary stop positions, information of realistic vehicle stop positions based on the quality of visibility determined by an ideal driver turns out to be reflected in the ideal running information.

The third method is a method for generating the ideal running information after estimating the state of visibility from the vehicle 30, using the three-dimensional topographical information of a road or an intersection. The three-dimensional topographical information includes position and height information of a structure, an object installed on a road surface, and so forth in the vicinity of an intersection and also includes information of a temporary stop line position set around an intersection. For example, the positions of a temporary stop line position (the $P_2$ spot within FIG. 6), an intersection boundary (the $P_6$ spot within FIG. 6), a traffic lane boundary (the $P_7$ spot within FIG. 6), and so forth, located in the vicinity of the current position of the vehicle 30, are extracted based on the three-dimensional topographical information. In accordance with the state of right-and-left visibility in the vicinity of the intersection, there is derived positions, such as the $P_1$, $P_3$, $P_4$, and $P_5$ spots in FIG. 6, which give a good visibility for viewing rightward and leftward the crossroad and sidewalk. These positions are stop position candidates where the ideal speed becomes "0" or less than or equal to a predetermined value near "0".

Next, in accordance with a distance between extracted stop position candidates, narrowing down of stop position candidates to be reflected in the ideal running information is implemented. For example, in a case where a distance between two stop position candidates is about several tens [cm], one stop position candidate is integrated with the other stop position candidate to reduce the number of stop position candidates. Alternatively, so as to secure a certain level of a distance between stop position candidates, correction may be added that displaces the position of a stop position candidate in a direction along the traveling direction of the vehicle 30.

After that, the ideal running information is generated so that the ideal speed becomes "0" or less than or equal to a predetermined value near "0" at the position of a stop position candidate. At this time, a restriction corresponding to the speed limit of a road or preliminarily set reference deceleration may be imposed on an ideal speed between stop position candidates or the change gradient thereof (acceleration or deceleration). In this way, in the method utilizing the three-dimensional topographical information, the ideal running information is generated based on a candidate position based on the presence or absence of a temporary stop line or a candidate position based on the state of visibility for rightward and leftward viewing. In addition, by performing correction, removal, and integration in accordance with the degree of proximity of these candidate positions, adequate candidate positions are narrowed down to generate desirable ideal running information.

[4-5. Output Example of Driving Diagnosis Result]

FIG. 10 illustrates an example of outputting to the driving diagnosis result output unit 11. Here, as evaluation items on the driving behavior of a driver at the time of passing through an intersection, detailed data, overall points, and a general comment are indicated in an image display device.

In the detailed data, for example, a percentage of actual temporary stops of the vehicle 30 at temporary stop lines or positions for viewing rightward and leftward (a temporary stop implementation rate), the amount of overrun from a temporary stop position, and the average value, minimum value, and maximum value thereof, and so forth are included. In addition, the detailed data includes information of the magnitude of deceleration before a temporarily stop, the presence or absence of driving at reduced speed between a plurality of temporary stop positions, the magnitude of start acceleration after a brief stop, and so forth. Furthermore, the detailed data includes the degree of similarity calculated in the ideal/actual running comparison diagnosis unit 26, a diagnosis result diagnosed in the history diagnosis unit 27, and so forth. In the example of FIG. 10, there are displayed simultaneously an evaluation of a current driving behavior at the time of passing through the last intersection and a statistical evaluation based on a history up to now to improve feedback performance for a driver.

The overall points are determined based on, for example, the degree of similarity calculated in the ideal/actual running comparison diagnosis unit 26, the temporary stop implementation rate included in the detailed data, acceleration and deceleration before or after a temporary stop, and so forth. Here, as the degree of similarity becomes high or the driving behavior becomes moderate, high overall points are assigned. The general comment provides an interpretation of the detailed data or the overall points, annunciates the tendency or habit of the driving behavior, and provides an evaluation relating to the safety of the driving behavior. In a case where there is recognized a significant correlation between a diagnosis result diagnosed in the history diagnosis unit 27 and the running state of the vehicle 30 is recognized, there are indicated a specific tendency in the driving behavior and a state in which the specific tendency appears.

[5. Flowcharts]

[5-1. Vehicle Side]

Figure 11:
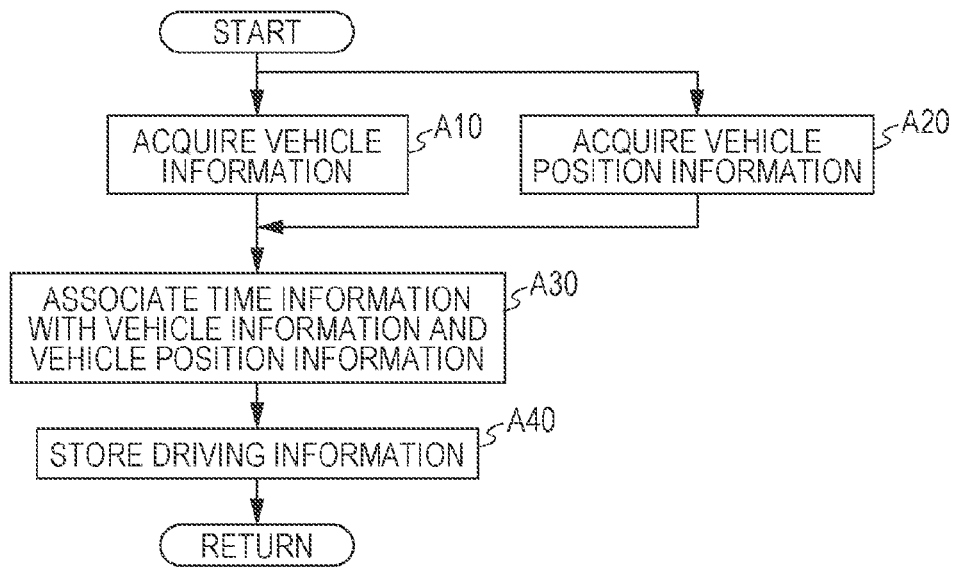
FIG. 11 is a flowchart exemplifying a control procedure implemented on a vehicle side.

FIG. 11 is a flowchart conceptually illustrating a control procedure implemented in the vehicle 30. This flow is recorded, as a computer program, for example, in a ROM in the electronic control device 33, and repeatedly implemented with a predetermined period.

In a step A10, in the vehicle information acquisition unit 35, pieces of vehicle information (the behavior information and the state information of the vehicle 30) are acquired that are transmitted from the various kinds of ECUs, the various kinds of sensors 41 to 45, and so forth. In this step, for example, the vehicle speed V, the wheel speed W, the acceleration X, and so forth are acquired, and the detailed travel distance L of the vehicle 30 is calculated based on the wheel speed W. The vehicle information acquired here is transmitted to the driving information management unit 36.

In a step A20, in the vehicle position identification unit 34, the vehicle position information (the information of the position and the traveling direction of the vehicle 30) is identified based on the positioning information transmitted from the GPS device 31. The position of the vehicle 30 is expressed by latitude and longitude. In addition, the traveling direction of the vehicle 30 is determined as, for example, the direction of a change from the last position. The vehicle position information acquired here is also transmitted to the driving information management unit 36. In the present flow, while it is assumed that the step A10 and the step A20 are subjected to parallel processing in parallel with each other, these steps may be connected in series and sequentially processed.

In a step A30, in the driving information management unit 36, the driving information is generated where the time information is associated with the vehicle information and the vehicle position information. After that, in a step A40, as illustrated in FIG. 4, the driving information is recorded as a driving record database in the driving information storage unit 37. Such processing is repeatedly implemented on the vehicle 30 side, and the driving information is accumulated in the driving information storage unit 37. In a case where the driving information interface unit 38 in the vehicle 30 and the server 10 are coupled to each other through the network 40, the driving information recorded in the driving information storage unit 37 is transmitted to the server 10 side. On the other hand, in a case where the vehicle 30 and the server 10 are not directly coupled to each other, the driving information is transmitted to the server 10 side through, for example, the recording medium 39.

[5-2. Server Side]

Figure 12:
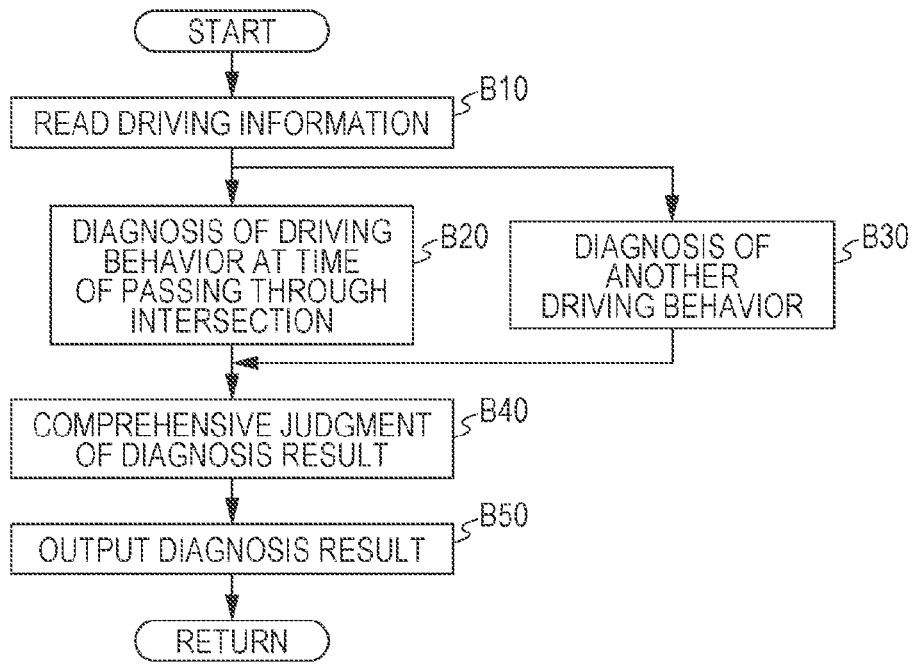
FIG. 12 is a flowchart exemplifying a diagnosis procedure implemented on a server side.
Figure 13:
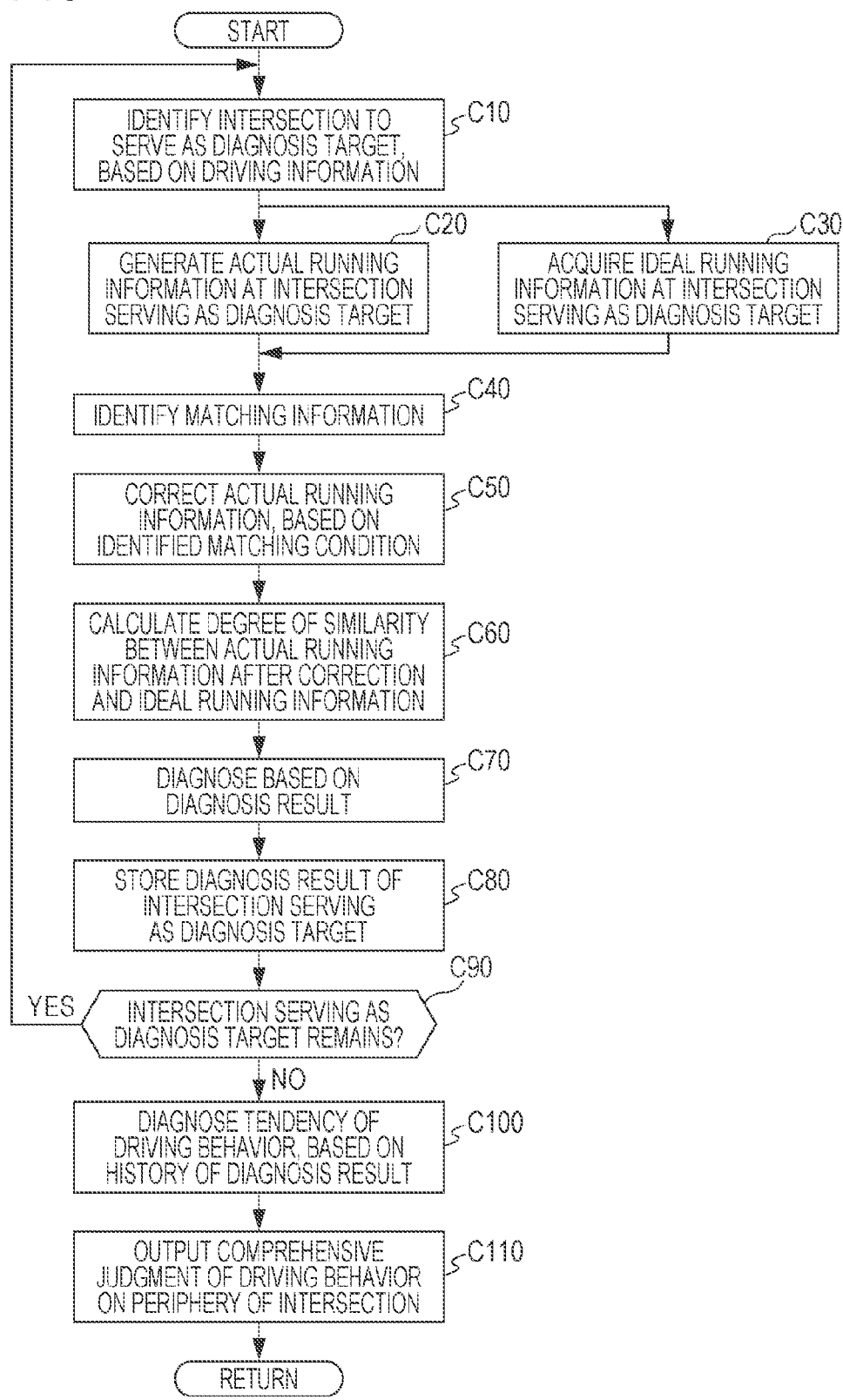
FIG. 13 is a flowchart exemplifying a diagnosis procedure that relates to a diagnosis driving behavior at the time of passing through an intersection and is implemented on the server side.

FIG. 12 and FIG. 13 are flowcharts conceptually illustrating a control procedure implemented in the server 10. These flows are described, as a computer program, on, for example, the recording medium 49 illustrated in FIG. 1, and repeatedly implemented in the driving diagnosis unit 14 with a predetermined period after being read by the server 10 through the medium readout unit 28. The flow illustrated in FIG. 12 corresponds to, for example, the entire flow of diagnosis executed after the driving information has been transmitted from the vehicle 30 side to the server 10. On the other hand, the flow illustrated in FIG. 13 corresponds to the flow of diagnosis executed in the driving-behavior-on-periphery-of-intersection diagnosis unit 20.

First, in a step B10 in FIG. 12, the driving information acquired on the vehicle 30 side is read into the driving diagnosis unit 14 in the server 10. The driving information is transmitted to the server 10, for example, through the network 40 in the case of the on-line diagnosis and through the recording medium 39 in the case of the off-line diagnosis. In a subsequent step B20, the diagnosis of a driving behavior when the vehicle 30 passes through an intersection is performed in the driving-behavior-on-periphery-of-intersection diagnosis unit 20. On the other hand, in a step B30, diagnosis based on the other diagnosis units (the smoothness diagnosis unit 16, the braking diagnoses unit 17, the curve diagnosis unit 18, and the eco-diagnosis unit 19) included in the driving diagnosis unit 14 are performed in parallel. Alternatively, the steps B20 and B30 may be connected in series and sequentially processed.

In a subsequent step B40, diagnosis results individually obtained in the steps B20 and B30 are transmitted to the driving diagnosis comprehensive judgment unit 15, and a comprehensive diagnosis result is judged. Diagnosis results and pieces of intermediate processing information by the individual diagnosis units 16 to 20 are recorded in the diagnosis history storage unit 13 along with the comprehensive diagnosis result. In addition, in a step B50, the comprehensive diagnosis result is transmitted from the driving diagnosis comprehensive judgment unit 15 to the driving diagnosis result output unit 11, and output to an image display device or an acoustic device as illustrated in FIG. 10.

Next, diagnosis in the driving-behavior-on-periphery-of-intersection diagnosis unit 20 will be described. The flow illustrated in FIG. 13 corresponds to diagnosis performed in the step B20 in the flow illustrated in FIG. 12. In a step C10, in the diagnosis target intersection identification unit 22, an intersection (an intersection to serve as a diagnosis target) through which the vehicle 30 has passed is identified as a specific intersection (a step of identifying a specific intersection). As for the identification of an intersection, identification is performed by matching a vehicle position included in the driving information and an intersection position included in the ideal running information. For example, the vehicle information (latitude and longitude) of the driving information illustrated in FIG. 4 and the individual intersection reference points (latitude and longitude) of the ideal running information illustrated in FIG. 5 are compared with each other to identify an intersection having an intersection reference point nearest to the coordinates of the vehicle information. Alternatively, in consideration of the traveling direction of the vehicle 30, an intersection whose likelihood is the highest may be identified. The intersection ID of an intersection identified in this way is transmitted to the detailed distance-speed correlation data generation unit 23 and the ideal/actual running detailed position condition correction unit 24.

In a step C20, actual running information at an intersection serving as a diagnosis target is generated in the detailed distance-speed correlation data generation unit 23 (a step of generating the actual running information). As illustrated by the dashed line graph within FIG. 7A, there is calculated a relationship between the actual vehicle speed V and the position of the vehicle 30. On the other hand, in a step C30, ideal running information, which corresponds to an intersection corresponding to the intersection ID and an approaching direction to the intersection, is read from the ideal driving information storage unit 12 to be stored into the ideal/actual running detailed position condition correction unit 24. While in the present flow it is assumed that the step C20 and the step C30 are subjected to parallel processing in parallel with each other, alternatively these steps may be connected in series and sequentially processed.

In a subsequent step C40, first in the ideal/actual running detailed position condition correction unit 24, the ideal running information and the actual running information are matched against each other to correct the gap of position information included in the actual running information (a step of identifying a matching condition). In this step, the magnitude of the correlation of the actual running information with the ideal running information is determined to identify a matching condition where the degree of correlation of the actual running information with the ideal running information exceeds a predetermined value. For example, a matching condition is identified where the correlation with the ideal running information becomes highest when a position included in the actual running information is changed.

For example, computing is performed that causes the first local minimum point A in the actual running information to coincide with the first local minimum point B in the ideal running information, where the local minimum point B is furthermost from the center of an intersection. Alternatively, as illustrated in FIGS. 7C to 7E, the horizontal displacement amount of the dashed line graph is computed where an area surrounded by the solid line graph of the ideal running information and the dashed line graph of the actual running information becomes less than or equal to a predetermined value or a minimum. In a case where the position of the vehicle 30 is estimated from an image of the vicinity of an intersection, shot by the camera 32, the matching condition is corrected in the camera correction unit 25.

In the following step C50, the actual running information is corrected, based on the matching condition identified in the previous step. Through the computing, the correlation of the actual running information with the ideal running information is enhanced to reduce an error relating to the position of the vehicle 30 included in the actual running information. In the camera correction unit 25, the actual running information is corrected based on the shooting time information indicating a time information of making a picture by using the camera 32 and the position information of the vehicle 30 (a step of correcting the matching condition, based on a pavement marking or a fixed structure). In this step, based on a shot image obtained by the camera 32, a relative position of the pavement marking or the fixed structure is identified, and the actual running information is corrected based on the relative position.

In a step C60, in the ideal/actual running comparison diagnosis unit 26, there is calculated the degree of similarity between the ideal running information and the actual running information after correction is calculated (a step of identifying a temporary stop position). In the step C60, as illustrated in FIG. 8A, there are calculated the magnitudes of differences such as $|V\text{data}(P_C) - V\text{best}(P_C)|$ and $|V\text{data}(P_D) - V\text{best}(P_D)|$ between the vehicle speed Vdata(p) and the ideal speed Vbest (p) at the positions $P_C$ and $P_D$ corresponding to the local minimum values of the ideal speed Vbest(p), and the addition value of $|V\text{data}(P_C) - V\text{best}(P_C)|$ and $|V\text{data}(P_D) - V\text{best}(P_D)|$ is calculated as the degree of similarity.

In the following step C70, in the ideal/actual running comparison diagnosis unit 26, a driving behavior is diagnosed based on the degree of similarity calculated in the previous step (a step of diagnosing the driving behavior). Here, as the degree of similarity between the ideal running information and the actual running information at a temporary stop position becomes high, it is diagnosed that the driving behavior of a driver is good (the skill, the degree of safety, and so forth of the driving behavior). In addition, the ideal running information and the actual running information are compared with each other, and, for example, the following diagnoses are performed.

whether or not driving at reduced speed has been performed before or after a temporary stop whether or not adequately stops at a position to temporarily stop at how large the gap of a stop position (a deficiency in a distance or a protruded distance) is In a step C80, such a diagnosis result as described above is transmitted to the diagnosis history storage unit 13 and stored therein (a step of storing a diagnosis result). The diagnosis result is associated with an intersection ID corresponding to an intersection and an approaching direction where the diagnosis result has been obtained, and is recorded. Accordingly, it becomes possible to determine which intersection the diagnosis result corresponds to a driving behavior at. In addition, in the diagnosis result, information of the kind of a temporary stop position is recorded with being associated with the actual running information used in the diagnosis. Accordingly, for example, it becomes possible to determine whether the gap of the actual stop position of the vehicle 30 has occurred at a temporary stop line, an intersection boundary, or a position for viewing.

In a step C90, in the diagnosis target intersection identification unit 22, a vehicle position included in the driving information and an intersection position included in the ideal running information are matched against each other again, and it is judged whether or not an intersection to serve as a diagnosis target remains (in other words, a piece of actual running information to serve as a diagnosis target). In a case where a diagnosis target still remains, the control proceeds to a step C10 to identify an intersection to serve as a subsequent diagnosis target. Accordingly, the steps C10 to C90 in the present flow are repeatedly implemented until diagnosis with respect to all intersections through which the vehicle 30 has passed has finished.

On the other hand, in a case where no diagnosis target remains in the step C90, it is determined that diagnosis with respect to all intersections through which the vehicle 30 has passed has finished, and the control proceeds to a step C100. In the step C100, in the history diagnosis unit 27, the driving behavior of the driver is diagnosed based on a historical diagnosis result recorded in the diagnosis history storage unit 13 (a step of diagnosing the tendency of the driving behavior). Here, for example, the habituation or the accidentalness in a diagnosis result is diagnosed, and a running condition is diagnosed where a habitual driving behavior is easy to occur.

For example, a diagnosis result is compared with respect to each kind of a temporary stop, and there is diagnosed the tendency of the driving behavior, such as "there is a tendency not to sufficiently stop at a temporary stop line" or "there is a tendency to temporarily stop in such a way as to protrude from a position with right and left vehicles visible". In addition, a diagnosis result is compared with respect to each classification pattern of an intersection, and there is diagnosed a tendency of the driving behavior, such as "there is a tendency to fail to temporarily stop at a specific intersection".

The result of the above-mentioned diagnosis based on the history of diagnosis results is also transmitted to the diagnosis history storage unit 13 and recorded therein. In addition, in a step C110, in the diagnosis control unit 21, there are aggregated various kinds of diagnosis results relating to a driving behavior when the vehicle 30 passes through the periphery of an intersection, and the aggregated various kinds of diagnosis results are transmitted to the driving diagnosis comprehensive judgment unit 15. The driving diagnosis comprehensive judgment unit 15 creates a comprehensive diagnosis result from the aggregated various kinds of diagnosis results, and records the comprehensive diagnosis result in the diagnosis history storage unit 13 to transmit the comprehensive diagnosis result to the driving diagnosis result output unit 11. At this time, such a diagnosis result as illustrated in FIG. 10 is displayed on the driving diagnosis result output unit 11. In addition, in a case where a diagnosis result has been transmitted to the vehicle 30 side through the interface unit 29, information corresponding to the diagnosis is output from the in-vehicle display, the in-vehicle speaker, or the like, and the driver of the vehicle 30 is informed thereof.

[6. Functions and Effects]

(1) In the above-mentioned server 10 (the driving diagnosis device), a driving diagnosis method implemented in the server 10, and a program relating to driving diagnosis, there is identified a matching condition where a correlation becomes greater than or equal to a predetermined strength when the ideal running information and the actual running information are matched against each other. For example, even if the position identification accuracy on the vehicle 30 is low and a gap between the solid line graph and the dashed line graph illustrated in FIG. 7A is large, a matching condition where the gap becomes small is identified.

It is possible to reduce a position error included in the actual running information, because the degree of similarity between the ideal running information and the actual running information is calculated after the matching condition where a correlation becomes greater than or equal to the predetermined strength has been identified. Accordingly, it may be possible to improve the degree of computing accuracy of the degree of similarity between the ideal running information and the actual running information, it may be possible to adequately diagnose the driving behavior of the vehicle 30, and it may be possible to improve driving diagnosis accuracy.

In the above-mentioned server 10, the ideal running information is stored that defines a relationship between a vehicle speed and a position with respect to each intersection, the relationship being to serve as a criterion when the vehicle 30 passes through the intersection. As illustrated in FIG. 6, this ideal running information is set in accordance with the structure and visibility of an intersection. Owing to this, it is possible to perform diagnosis where an environmental difference with respect to each intersection is taken into consideration, and it may be possible to improve the driving diagnosis accuracy.

(2) In addition, in a case in which as a condition for matching the ideal running information and the actual running information against each other, a condition is identified where a correlation between the ideal running information and the actual running information becomes a maximum, it may be possible to reduce a position error in the actual running information, estimated from a relationship with the ideal running information. Owing to this, it may be possible to compute the degree of similarity with a high degree of accuracy, and it may be possible to improve the degree of accuracy of the diagnosis of the driving behavior.

In addition, when a vehicle speed after correction is set with taking into consideration not only the gap of one local minimum point but also the gaps of a plurality of local minimum points in respect to the local minimum points at graphically representing the actual running information, it may be possible to improve the degree of computing accuracy of the degree of similarity. Alternatively, in a case where the vehicle speed after correction is set with taking into consideration the area surrounded by the solid line graph and the dashed line graph as illustrated in FIGS. 7C to 7E, it may be also possible to improve the degree of computing accuracy of the degree of similarity.

(3) In addition, the temporary stop position of the vehicle 30 is identified in a state where a correlation between the ideal running information and the actual running information is enhanced, the driving behavior is diagnosed based on the degree of similarity at the temporary stop position, and hence, it may be possible to adequately evaluate and diagnose the driving behavior regardless of a temporary stop line, an intersection boundary, and the quality of visibility, which are different with respect to each intersection.

In addition, even in a case where the vehicle speed V at the time of driving at reduced speed is greatly different from an ideal speed at the position thereof, it turns out that the degree of safety of the driving behavior is high when the vehicle speed V is slower than the ideal speed, and it turns out that the degree of safety of the driving behavior is low when the vehicle speed V is faster than the ideal speed. In other words, a low degree of similarity does not mean that the degree of safety is low. On the other hand, in diagnosis based on the degree of similarity at the temporary stop position of the vehicle 30, it turns out that the vehicle 30 stops at the temporary stop more accurate position with the increase in the degree of similarity. Accordingly, an ambiguity disappears in a relationship between the degree of similarity and the degree of safety, and it may be possible to adequately evaluate and diagnose the driving behavior.

(4) A diagnosis result is stored with being associated with the kind of a temporary stop position in the diagnosis history storage unit 13. By causing the diagnosis result to be stored with respect to each kind of a temporary stop position, it is possible to determine with a high degree of accuracy a driving tendency such as an average vehicle speed immediately before a temporary stop, a protruded distance or overrun distance from a temporary stop line, or an average vehicle speed in a case of not having temporarily stopped, and it may be possible to refine the diagnosis content of the driving behavior. Owing to this, it may be possible to adequately diagnose the driving behavior.

(5) A diagnosis result is recorded with being associated with an intersection ID in the diagnosis history storage unit 13. By causing the diagnosis result to be stored with respect to each intersection ID, it is possible to determine a tendency not to temporarily stop at a specific intersection with a high degree of accuracy. Owing to this, it may be possible to determine that the driver has no awareness of an intersection to temporarily stop at, and it may be possible to refine the diagnosis content of the driving behavior. Owing to this, it may be possible to adequately diagnose the driving behavior.

(6) In the camera correction unit 25, a position of a pavement marking or a fixed structure is detected from an image of the vicinity of an intersection, and a matching condition is corrected based on the position of the pavement marking or the fixed structure relative to the vehicle 30. Owing to this, it may be possible to reduce a position error included in the actual running information, and it may be possible to improve the degree of computing accuracy of the degree of similarity.

(7) As for the setting of the ideal running information caused to be stored in the ideal driving information storage unit 12, a method may also be adopted where, as illustrated in FIG. 9A, there is created representative running information relating to individual groups into which intersections are classified with respect to the individual features thereof and the representative running information is corrected at individual intersections. In other words, it is a method where the ideal running information is prepared with respect to each of a plurality of intersection patterns corresponding to a position with visibility corresponding to a visual recognition target. Owing to this, it may be possible to save the effort of setting ideal running information with respect to all intersections through which the vehicle 30 is able to pass, and it may be possible to reduce the storage capacity of the ideal driving information storage unit 12.

(8) In the above-mentioned server 10 (the driving diagnosis device), the driving diagnosis method implemented in the server 10, and the program relating to driving diagnosis, when the ideal running information and the actual running information are matched against each other, there are determined a correlation or the degree of similarity between a position and a speed expressed by a graph. In this way, by performing diagnosis using the graph, it becomes easy to quantitatively determine the driving behavior, it may be possible to adequately diagnose the driving behavior of the vehicle 30, and it may be possible to improve the driving diagnosis accuracy.

[7. Examples of Modification]

In spite of an example of the disclosed embodiment, the present technology may be variously modified and implemented without departing from the scope of the present embodiment. Each configuration and each processing operation in the present embodiment may be sorted out as desired, or arbitrarily combined.

While, in the above-mentioned embodiment, as illustrated in FIG. 1, the distributed processing driving diagnosis system has been exemplified that performs diagnosis in the server 10 provided separately from the vehicle 30, it is possible to embed the function of the server 10 in the vehicle 30. In other words, it is possible to construct a stand-alone system performing diagnosis using only the vehicle 30. Specifically, the same function as the server 10 may be installed in the electronic control device 33 in the vehicle 30, and a control unit independent from the electronic control device 33 may be mounted in the vehicle 30. Alternatively, the function of the server 10 may be realized using an existing in-vehicle device (for example, a car navigation system for a vehicle, a digital tachograph device, or the like).

In addition, while, in the above-mentioned embodiment, control has been described that causes the driving diagnosis result output unit 11, the in-vehicle display, or the like to display a diagnosis result relating to the driving behavior, a method for utilizing a diagnosis result is not limited to this. For example, a driver may be alerted based on a diagnosis result (putting on an annunciation lamp, emitting a warning sound, or the like), or the behavior of the vehicle 30 may be corrected based on a diagnosis result (controlling increases or decreases in a driving force and a braking force, or the like).

In addition, in the above-mentioned embodiment, the diagnosis method has been exemplified that matches an actual pattern and an ideal pattern against each other, which relates to a relationship between a vehicle speed and a position, and compares the actual pattern and the ideal pattern with each other. On the other hand, a diagnosis method may be adopted that matches an actual pattern and an ideal pattern against each other and compares the actual pattern and the ideal pattern with each other, using the acceleration, the yaw rate, the engine rotation number, and so forth of the vehicle 30, in addition to these parameters.

The "ideal running information" in the above-mentioned embodiment may not be fixed information preliminarily set, and may be changed by the update of data performed by the user of the vehicle 30. For example, a control configuration may be added that redefines the ideal running information by newly adding information of a position to temporarily stop at. Alternatively, a control configuration may be adopted that newly adds not the temporary stop but information of a position and interval to run through at a predetermined speed and performs diagnosis including driving behaviors at the added position and within the added interval.

While, in the above-mentioned embodiment, the diagnosis of a driving state at the time of passing through an intersection has been exemplified, a diagnosis target is not limited to the driving state at the time of passing through an intersection. For example, a driving state when the vehicle 30 passes through a railroad crossing may be diagnosed, or a driving state at the time of running on a ramp way may be diagnosed.

In this way, various running environments (roads) through which the vehicle 30 is able to pass may serve as diagnosis targets. Accordingly, the "ideal running information" in the above-mentioned embodiment may be information where a relationship between a vehicle speed and a position corresponding to a running environment (road) is defined, and the "actual running information" may be information expressing a relationship between an actual vehicle speed and an actual position when the vehicle 30 actually runs (passes through a road).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for diagnosing driving behavior comprising:
    a processor; and
    a memory which stores a plurality of instructions, which when executed by the processor, cause the processor to execute:
        storing ideal running information in a first storage defining a relationship between a vehicle speed and a vehicle position corresponding to a road situation;
        generating actual running information expressing a relationship between an actual vehicle speed and an actual position when a vehicle passes through a road;
        identifying a matching condition where the degree of correlation of the actual running information with the ideal running information exceeds a predetermined value;
        diagnosing a driving behavior of a driver of the vehicle, based on a degree of similarity between the ideal running information and the actual running information under the identified matching condition; and
        identifying a temporary stop position of the vehicle by comparing the ideal running information and the actual running information with each other under the identified matching condition, wherein
        the diagnosing diagnoses the driving behavior, based on the degree of similarity at the identified temporary stop position.

2. The apparatus for diagnosing driving behavior according to claim 1, wherein
    the identifying identifies, as the matching condition, the condition where the correlation with the ideal running information becomes highest when the actual position included in the actual running information is changed.

3. The apparatus for diagnosing driving behavior according to claim 1, wherein the processor further executes:
    storing a diagnosis result in a second storage based on the diagnosing with respect to each of kinds of the temporary stop position; and
    diagnosing a tendency of the driving behavior with respect to the each of kinds, based on a relationship between the stored diagnosis result stored in the second storage and corresponding the each of kinds.

4. The apparatus for diagnosing driving behavior according to claim 1, wherein the processor further executes:
    storing in a third storage the diagnosis result in the diagnosing with associating the diagnosis result with the road relating to the diagnosis result; and
    diagnosing a tendency of the driving behavior in the road, based on a relationship between the stored diagnosis result stored in the third storage and the road.

5. The apparatus for diagnosing driving behavior according to claim 1, wherein the processor further executes:
    correcting the matching condition, based on a position of a pavement marking or a fixed structure relative to the vehicle.

6. The apparatus for diagnosing driving behavior according to claim 1, wherein the processor further executes:
    identifying an intersection through which the vehicle has passed among a plurality of intersections, wherein
    the storing stores the ideal running information with respect to each intersection, and
    the generating generates the actual running information at the identified intersection.

7. The apparatus for diagnosing driving behavior according to claim 1, wherein
    the diagnosing diagnoses the driving behavior of the driver of the vehicle, based on a correlation or the degree of similarity between a graph of the ideal running information and a graph of the actual running information.

8. The apparatus for diagnosing driving behavior according to claim 6, wherein
    the storing stores the ideal running information with respect to each of a plurality of intersection patterns classified in accordance with visibility of a visual recognition target.

9. A method for diagnosing driving behavior on the basis of ideal running information defining a relationship between a vehicle speed and a vehicle position of a vehicle corresponding to a situation of a road, when the vehicle passes through an intersection, the method comprising:
    generating actual running information expressing a relationship between an actual vehicle speed and an actual position when the vehicle passes through the road;
    identifying a matching condition, using a computer, where a correlation with the ideal running information becomes highest when the actual position included in the actual running information is changed;
    identifying a temporary stop position of the vehicle by comparing the ideal running information and the actual running information with each other under the matching condition; and
    diagnosing the driving behavior at the identified temporary stop position on the basis of a degree of similarity between the ideal running information and the actual running information under the matching condition.

10. The method for diagnosing driving behavior according to claim 9, further comprising:
    storing diagnosis result corresponding to the driving behavior diagnosed by the diagnosing with respect to corresponding a kind of the temporary stop position;
    diagnosing a tendency of the driving behavior with respect to each the kind on the basis of a relationship between the diagnosis result stored and the kind;
    storing the diagnosis result with associating a road relating to the diagnosing; and
    diagnosing a tendency of the driving behavior in the road on the basis of a relationship between the diagnosis result stored and the road.

11. The method for diagnosing driving behavior according to claim 9, further comprising:

correcting the matching condition on the basis of a position of a pavement marking or a fixed structure relative to the vehicle.

12. The method for diagnosing driving behavior according to a claim 9, further comprising:
   defining the ideal running information relating to an intersections:
   identifying a specific intersection among a plurality of intersections, the vehicle having passed the specific intersection; and
   generating actual running information at the specific intersection.

13. The method for diagnosing driving behavior according to claim 12, wherein
   each of a plurality of intersection patterns classified in accordance with visibility of a visual recognition target is stored in the ideal running information.

14. A non-transitory computer-readable recording medium having stored a control program for causing an apparatus for diagnosing driving behavior on the basis of ideal running information defining a relationship between a vehicle speed and a vehicle position corresponding to a road situation, the driving behavior being when the vehicle passes through an intersection, the control program causing the apparatus to execute processing, the processing comprising:
   generating actual running information expressing a relationship between an actual vehicle speed and an actual position when the vehicle passes through a road;
   identifying a matching condition where the degree of correlation of the actual running information with the ideal running information exceeds a predetermined value;
   diagnosing the driving behavior, based on the degree of similarity between the ideal running information and the actual running information under the matching condition;
   storing a diagnosis result corresponding to the driving behavior diagnosed by the diagnosing with respect to a corresponding type of temporary stop position;
   diagnosing a tendency of the driving behavior with respect to each type of temporary stop position based on a relationship between the stored diagnosis result and the corresponding type of temporary stop position;
   storing the diagnosis result with a road relating to the diagnosing; and
   diagnosing a tendency of the driving behavior on the road based on a relationship between the stored diagnosis result and the road.

15. The non-transitory computer-readable recording medium according to claim 14, the control program further causing the apparatus to execute processing, the processing comprising:
   correcting the matching condition on the based on a position of a pavement marking or a fixed structure relative to the vehicle.

16. The non-transitory computer-readable recording medium according to claim 14, the control program further causing the apparatus to execute processing, the processing comprising:
   defining the ideal running information relating to an intersections:
   identifying a specific intersection among a plurality of intersections, the vehicle having passed the specific intersection; and
   generating actual running information at the specific intersection.

17. The non-transitory computer-readable recording medium according to claim 16, the control program further causing the apparatus to execute processing, the processing comprising:
   each of a plurality of intersection patterns classified in accordance with visibility of a visual recognition target is stored in the ideal running information.

* * * * *